United States Patent
Featonby et al.

(10) Patent No.: US 12,190,144 B1
(45) Date of Patent: Jan. 7, 2025

(54) PREDELIVERING CONTAINER IMAGE LAYERS FOR FUTURE EXECUTION OF CONTAINER IMAGES

(71) Applicant: Amazon Technologies, Inc., Seattle, WA (US)

(72) Inventors: Malcolm Featonby, Sammamish, WA (US); Omar Paul, Bellevue, WA (US); Munindra N Das, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1044 days.

(21) Appl. No.: 16/908,533

(22) Filed: Jun. 22, 2020

(51) Int. Cl.
| | |
|---|---|
| *G06F 9/455* | (2018.01) |
| *G06F 9/48* | (2006.01) |
| *G06F 9/50* | (2006.01) |
| *H04L 67/10* | (2022.01) |
| *H04L 67/568* | (2022.01) |
| *G06F 8/61* | (2018.01) |

(52) U.S. Cl.
CPC ............ *G06F 9/48* (2013.01); *G06F 9/45558* (2013.01); *G06F 9/5011* (2013.01); *H04L 67/10* (2013.01); *H04L 67/568* (2022.05); *G06F 8/63* (2013.01); *G06F 2009/45562* (2013.01); *G06F 2209/5011* (2013.01)

(58) Field of Classification Search
None
See application file for complete search history.

(56) References Cited

U.S. PATENT DOCUMENTS

| | | |
|---|---|---|
| 7,844,480 B2 | 11/2010 | Ricketts |
| 8,898,402 B1 | 11/2014 | Stronge |
| 9,110,496 B1 | 8/2015 | Michelsen |
| 9,152,441 B2 | 10/2015 | Anderson |
| 9,164,802 B2 | 10/2015 | Netto |
| 9,256,467 B1 | 2/2016 | Singh et al. |
| 9,549,038 B1 | 1/2017 | Anne |
| 9,667,498 B2 | 5/2017 | Wu et al. |
| 9,848,041 B2 | 12/2017 | Einkauf et al. |
| 9,898,347 B1 | 2/2018 | Gupta |

(Continued)

OTHER PUBLICATIONS

U.S. Appl. No. 16/217,454, filed Dec. 12, 2018, Aithal et al.
(Continued)

*Primary Examiner* — Bing Zhao
(74) *Attorney, Agent, or Firm* — Knobbe, Martens, Olson & Bear, LLP

(57) ABSTRACT

Generally described, one or more aspects of the present application relate to prefetching container image layers for use in a cluster of compute instances. For example, the dependencies among the individual layers within the container images stored and/or executed on a cloud provider network may be analyzed. Then, the layers that are likely to be used by a user of the cloud provider network may be identified and prefetched into the caches of the compute instances provided by the cloud provider network, before execution of the container images including such layers is requested by the user. By doing so, the latency between the time a request to execute a set of container images is received and the time the execution of the set of container images is actually initiated can be reduced, thereby providing an improved and more efficient application execution experience to the user.

20 Claims, 13 Drawing Sheets

(56) References Cited

U.S. PATENT DOCUMENTS

| | | | |
|---|---|---|---|
| 9,910,713 B2 | 3/2018 | Wisniewski et al. | |
| 9,928,108 B1 | 3/2018 | Wagner et al. | |
| 9,971,621 B1 | 5/2018 | Berg et al. | |
| 9,983,796 B2* | 5/2018 | Yang | G06F 3/0656 |
| 10,002,026 B1 | 6/2018 | Wagner | |
| 10,067,785 B1 | 9/2018 | Wei et al. | |
| 10,067,801 B1 | 9/2018 | Wagner | |
| 10,135,712 B2 | 11/2018 | Wu et al. | |
| 10,191,778 B1 | 1/2019 | Yang | |
| 10,310,966 B1 | 6/2019 | Ge et al. | |
| 10,397,255 B1 | 8/2019 | Bhalotra et al. | |
| 10,432,551 B1 | 10/2019 | Vosshall et al. | |
| 10,581,964 B2 | 3/2020 | Einkauf et al. | |
| 10,606,646 B1 | 3/2020 | Christensen | |
| 10,606,660 B1 | 3/2020 | Hartley et al. | |
| 10,771,337 B1 | 9/2020 | Das et al. | |
| 10,824,474 B1 | 11/2020 | Kamboj et al. | |
| 10,871,995 B2 | 12/2020 | Gerdesmeier et al. | |
| 10,901,764 B2* | 1/2021 | Tegtmeier | H04L 67/568 |
| 11,263,034 B2 | 3/2022 | Wagner et al. | |
| 11,385,938 B2 | 7/2022 | Kim | |
| 11,392,422 B1 | 7/2022 | Filiz et al. | |
| 11,403,150 B1 | 8/2022 | Featonby et al. | |
| 11,422,844 B1 | 8/2022 | Filiz et al. | |
| 11,449,355 B2* | 9/2022 | Jin | G06F 9/45558 |
| 11,487,591 B1 | 11/2022 | Featonby | |
| 11,573,816 B1 | 2/2023 | Featonby et al. | |
| 11,762,706 B1 | 9/2023 | Jarvis et al. | |
| 11,797,287 B1 | 10/2023 | Ghai et al. | |
| 11,853,807 B1 | 12/2023 | Coult et al. | |
| 11,892,418 B1 | 2/2024 | Featonby et al. | |
| 11,989,586 B1 | 5/2024 | Srikanta et al. | |
| 11,995,466 B1 | 5/2024 | Srikanta et al. | |
| 2005/0002375 A1 | 1/2005 | Gokhale et al. | |
| 2008/0282267 A1 | 11/2008 | Adam et al. | |
| 2011/0246515 A1 | 10/2011 | Johnson et al. | |
| 2012/0179824 A1 | 7/2012 | Jackson | |
| 2012/0210326 A1 | 8/2012 | Torr et al. | |
| 2012/0233668 A1 | 9/2012 | Leafe et al. | |
| 2013/0124807 A1 | 5/2013 | Nielsen et al. | |
| 2013/0160008 A1 | 6/2013 | Cawlfield et al. | |
| 2013/0238785 A1 | 9/2013 | Hawk et al. | |
| 2013/0297964 A1 | 11/2013 | Hedgal | |
| 2013/0318132 A1 | 11/2013 | Basu et al. | |
| 2014/0079207 A1 | 3/2014 | Zhakov et al. | |
| 2014/0358710 A1 | 12/2014 | Balestrieri et al. | |
| 2014/0366093 A1 | 12/2014 | Oh et al. | |
| 2015/0106805 A1 | 4/2015 | Melander et al. | |
| 2015/0142878 A1 | 5/2015 | Hebert et al. | |
| 2016/0077846 A1 | 3/2016 | Phillips et al. | |
| 2016/0112497 A1 | 4/2016 | Koushik et al. | |
| 2016/0274928 A1 | 9/2016 | Linton et al. | |
| 2016/0323377 A1 | 11/2016 | Einkauf et al. | |
| 2016/0378559 A1 | 12/2016 | Bhandarkar et al. | |
| 2017/0060621 A1 | 3/2017 | Whipple et al. | |
| 2017/0063659 A1 | 3/2017 | Platon et al. | |
| 2017/0078433 A1 | 3/2017 | Radhakrishnan et al. | |
| 2017/0090960 A1 | 3/2017 | Anderson et al. | |
| 2017/0090961 A1 | 3/2017 | Wagner et al. | |
| 2017/0115978 A1 | 4/2017 | Modi et al. | |
| 2017/0140526 A1 | 5/2017 | Chen et al. | |
| 2017/0177413 A1 | 6/2017 | Wisniewski et al. | |
| 2017/0177860 A1 | 6/2017 | Suarez et al. | |
| 2017/0177877 A1 | 6/2017 | Suarez et al. | |
| 2017/0180346 A1* | 6/2017 | Suarez | G06F 21/6209 |
| 2017/0339158 A1 | 11/2017 | Lewis et al. | |
| 2017/0339196 A1 | 11/2017 | Lewis et al. | |
| 2017/0371703 A1 | 12/2017 | Wagner et al. | |
| 2017/0372703 A1 | 12/2017 | Wagner et al. | |
| 2018/0004503 A1 | 1/2018 | OlmstedThompson | |
| 2018/0060133 A1 | 3/2018 | Fang et al. | |
| 2018/0088993 A1 | 3/2018 | Gerdesmeier et al. | |
| 2018/0101403 A1 | 4/2018 | Baldini Soares et al. | |
| 2018/0129539 A1 | 5/2018 | Sadat | |
| 2018/0150325 A1 | 5/2018 | Kuo et al. | |
| 2018/0246745 A1 | 8/2018 | Aronovich et al. | |
| 2018/0267990 A1* | 9/2018 | Cherukuri | G06F 8/60 |
| 2018/0278639 A1 | 9/2018 | Bernstein et al. | |
| 2018/0285204 A1 | 10/2018 | Dwarampudi et al. | |
| 2018/0331971 A1 | 11/2018 | Certain et al. | |
| 2018/0336345 A1 | 11/2018 | Georgiev | |
| 2019/0050680 A1 | 2/2019 | Waugh et al. | |
| 2019/0079788 A1* | 3/2019 | Ruty | G06F 3/0665 |
| 2019/0102231 A1 | 4/2019 | Wagner | |
| 2019/0108049 A1 | 4/2019 | Singh et al. | |
| 2019/0146772 A1 | 5/2019 | Griffin et al. | |
| 2019/0146774 A1 | 5/2019 | Moore et al. | |
| 2019/0149406 A1 | 5/2019 | Fratini | |
| 2019/0188107 A1 | 6/2019 | Alston et al. | |
| 2019/0243681 A1 | 8/2019 | Chen | |
| 2019/0294477 A1 | 9/2019 | Koppes et al. | |
| 2019/0324786 A1 | 10/2019 | Ranjan et al. | |
| 2019/0340033 A1 | 11/2019 | Ganteaume | |
| 2019/0342266 A1 | 11/2019 | Ramachandran et al. | |
| 2019/0347127 A1 | 11/2019 | Coady et al. | |
| 2019/0391834 A1 | 12/2019 | Mullen | |
| 2019/0392045 A1 | 12/2019 | De Lima Junior et al. | |
| 2020/0051017 A1 | 2/2020 | Dujmic | |
| 2020/0073649 A1 | 3/2020 | Viana et al. | |
| 2020/0084202 A1 | 3/2020 | Smith et al. | |
| 2020/0133718 A1 | 4/2020 | Koehler | |
| 2020/0142711 A1 | 5/2020 | Varda et al. | |
| 2020/0174842 A1 | 6/2020 | Wang et al. | |
| 2020/0210227 A1 | 7/2020 | Xie et al. | |
| 2020/0213279 A1 | 7/2020 | Xiong et al. | |
| 2020/0241930 A1 | 7/2020 | Garg et al. | |
| 2020/0249977 A1 | 8/2020 | Mentz et al. | |
| 2020/0310845 A1 | 10/2020 | Liguori et al. | |
| 2020/0310850 A1 | 10/2020 | Liguori et al. | |
| 2020/0356387 A1 | 11/2020 | Anwar et al. | |
| 2020/0358719 A1 | 11/2020 | Mestery et al. | |
| 2020/0412596 A1 | 12/2020 | Cherunni | |
| 2021/0019179 A1 | 1/2021 | Yadav et al. | |
| 2021/0064442 A1 | 3/2021 | Alluboyina et al. | |
| 2021/0089361 A1 | 3/2021 | Rafey et al. | |
| 2021/0109775 A1 | 4/2021 | Shen et al. | |
| 2021/0117217 A1 | 4/2021 | Croteau et al. | |
| 2021/0141655 A1 | 5/2021 | Gamage et al. | |
| 2021/0144517 A1 | 5/2021 | Guim et al. | |
| 2021/0158083 A1 | 5/2021 | Gan et al. | |
| 2021/0160162 A1 | 5/2021 | Abbas | |
| 2021/0184942 A1 | 6/2021 | Tootaghaj et al. | |
| 2021/0191748 A1 | 6/2021 | Ito | |
| 2021/0232344 A1 | 7/2021 | Corrie | |
| 2021/0311764 A1* | 10/2021 | Rosoff | G06F 9/5077 |
| 2021/0357255 A1 | 11/2021 | Mahadik et al. | |
| 2022/0188167 A1 | 6/2022 | Lyer et al. | |
| 2022/0229651 A1 | 7/2022 | Wu et al. | |

OTHER PUBLICATIONS

U.S. Appl. No. 16/367,801, filed Mar. 28, 2019, Featonby et al.
U.S. Appl. No. 16/699,309, filed Nov. 29, 2019, Goodman et al.
U.S. Appl. No. 16/909,756, filed Jun. 23, 2020, Featonby et al.
Chavan, et al., "Clustered Virtual Machines for Higher Availability of Resources with Improved Scalability in Cloud Computing," 2014 IEEE, pp. 221-225.
Chen, et al., "Virtual Cluster: Customizing the Cluster Environment through Virtual Machines," 2008 IEEE, pp. 411-416.
Dettori, "Blueprint for Business Middleware as a Managed Cloud Service", IEEE International Conference on Cloud Engineering, 2014, pp. 261-270.
Sharifi, et al., "VCE: A New Personated Virtual Cluster Engine for Cluster Computing," 2008 IEEE, 6 pages.

* cited by examiner

PREDELIVERING CONTAINER IMAGE LAYERS FOR FUTURE EXECUTION OF CONTAINER IMAGES

BACKGROUND

Modern computer systems are frequently implemented as distributed collections of computer systems operating collectively within one or more host computer system environments. Such a host computer environment may deploy applications across multiple clusters of servers or virtual machines and manage the applications and the clusters on behalf of customers.

DETAILED DESCRIPTION

Introduction

Figure 1:
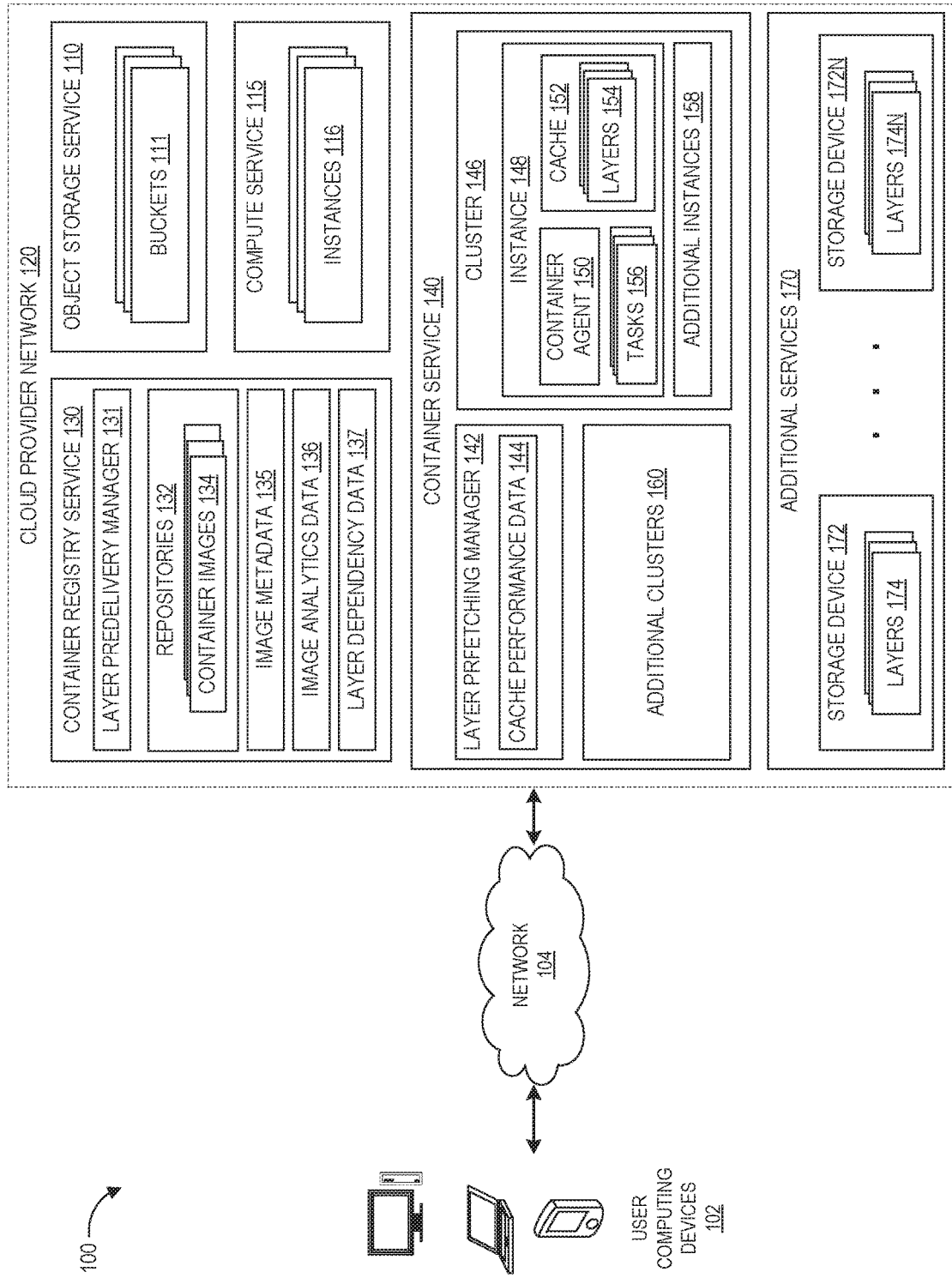
FIG. 1 depicts a diagram of a network environment in which a cloud provider network is used to implement a container registry service and a layer predelivery manager in accordance with aspects of the present disclosure.

Many software applications can run using one or more computing "clusters," which can include at least one cluster master (which runs control processes including scheduling, resource control, handling API requests, and deciding what runs on the cluster's nodes) and multiple nodes (which are the worker machines that run containerized applications and other workloads). These clusters can run across a number of physical machines in a distributed computing environment such as a cloud provider network.

A developer can package a software application and everything else needed to run the application in a container image (e.g., a standalone, executable package of software that includes everything needed to run an application process) and send a request to the cloud provider network to execute the application in a cluster. In the request, the developer may indicate where the container image can be found, typically in an image repository within the cloud provider network or in a public image repository outside the cloud provider network. However, the size of these container images can get quite large, and having to download them at runtime from remote repositories can significantly increase the latency between the time such a request to execute an application is received and the time the execution of the application is actually initiated.

The aforementioned challenges, among others, are addressed in some embodiments by the disclosed techniques for prefetching or predelivering certain container image layers (which are the building blocks that make up a given container image) that are frequently used across multiple container images stored on the cloud provider network into the caches of one or more compute instances such that when a user requests execution of a set of container images, some or all of the container image layers of the set of container images can be accessed from the cache, rather than from a remote container image repository, thereby reducing the latency associated with launching the set of container images.

More specifically, the presently disclosed technology addresses these deficiencies by analyzing the dependencies among the individual layers within the container images stored and/or executed on the cloud provider network, determining which layers are likely to be used by a user of the cloud provider network, and prefetching or predelivering such layers into the caches of the compute instances of the cloud provider network before execution of the container images including such layers is requested by the user. By doing so, the latency between the time a request to execute a set of container images is received and the time the execution of the set of container images is actually initiated can be reduced, thereby providing an improved and more efficient application execution experience to the user.

As will be appreciated by one of skill in the art in light of the present disclosure, the embodiments disclosed herein improve the ability of computing systems, such as container systems and code execution systems, to provide mechanisms for reducing the latency associated with code execution on compute instances provided by a cloud provider network. By allowing the container images to be prefetched or predelivered prior to execution requests requiring those container images are received, the cloud provider network of the present disclosure can address the deficiencies described above.

Prior techniques generally relied on caching previously used container images, and potentially loading the container images from the cache if another execution request needs the same container images before the container images in the cache are overwritten. However, such approaches would provide guaranteed cold starts for all code executions that occur for the first time on a given compute capacity (e.g., computing resources, which may be virtualized or bare-metal, that can be used to perform the code executions) since the cache would be empty for such executions. In contrast, embodiments of the present disclosure enable active prefetching or predelivery of the layers of the container images into the caches of the compute instances provided by the cloud provider network (as opposed to caching in response to such layers or container images being executed), and by the time a code execution request requiring a set of container images are received, some or all layers of the set of container images may already be stored in the cache of one of the compute instances. The cloud provider network can utilize such a compute instance to perform the requested execution of the container images, thereby reducing the time it takes to download the required set of container images onto the compute instance prior to initiating the execution.

The presently disclosed embodiments therefore address technical problems inherent within computing systems, such as the latency associated with on-demand code execution on a cloud provider network, especially on compute capacity newly added to a cluster or compute capacity that is used for the first time. These technical problems are addressed by the various technical solutions described herein, including analyzing the dependencies among the individual layers within the container images stored and/or executed on the cloud provider network, and prefetching or predelivering layers that are likely to be used into the caches of the compute instances of the cloud provider network before execution of the container images including such layers is requested. Thus, the present disclosure represents an improvement on existing software execution systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Container Service and Prefetching Manager FIG. 1 depicts an example computing environment 100 including a cloud provider network 120 in which the disclosed container service and layer prefetching manager can be implemented. A cloud provider network (sometimes referred to as a cloud provider system or simply a "cloud") refers to a large pool of network-accessible computing resources (such as compute, storage, and networking resources, applications, and services), which may be virtualized (e.g., virtual machines) or bare-metal (e.g., bare-metal instances or physical machines). The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed techniques for prefetching and managing container image layers may be implemented in non-elastic computing environments as well.

The cloud provider network 120 can be accessed by user computing devices 102 over a network 104. The cloud provider network 120 may include a container registry service 130, a container service 140, additional services 170, an object storage service 110, and a compute service 115 that are in networked communication with one another and with the network 104 to provide users with on-demand access to the services and resources provided by the cloud provider network 120.

Figure 3:
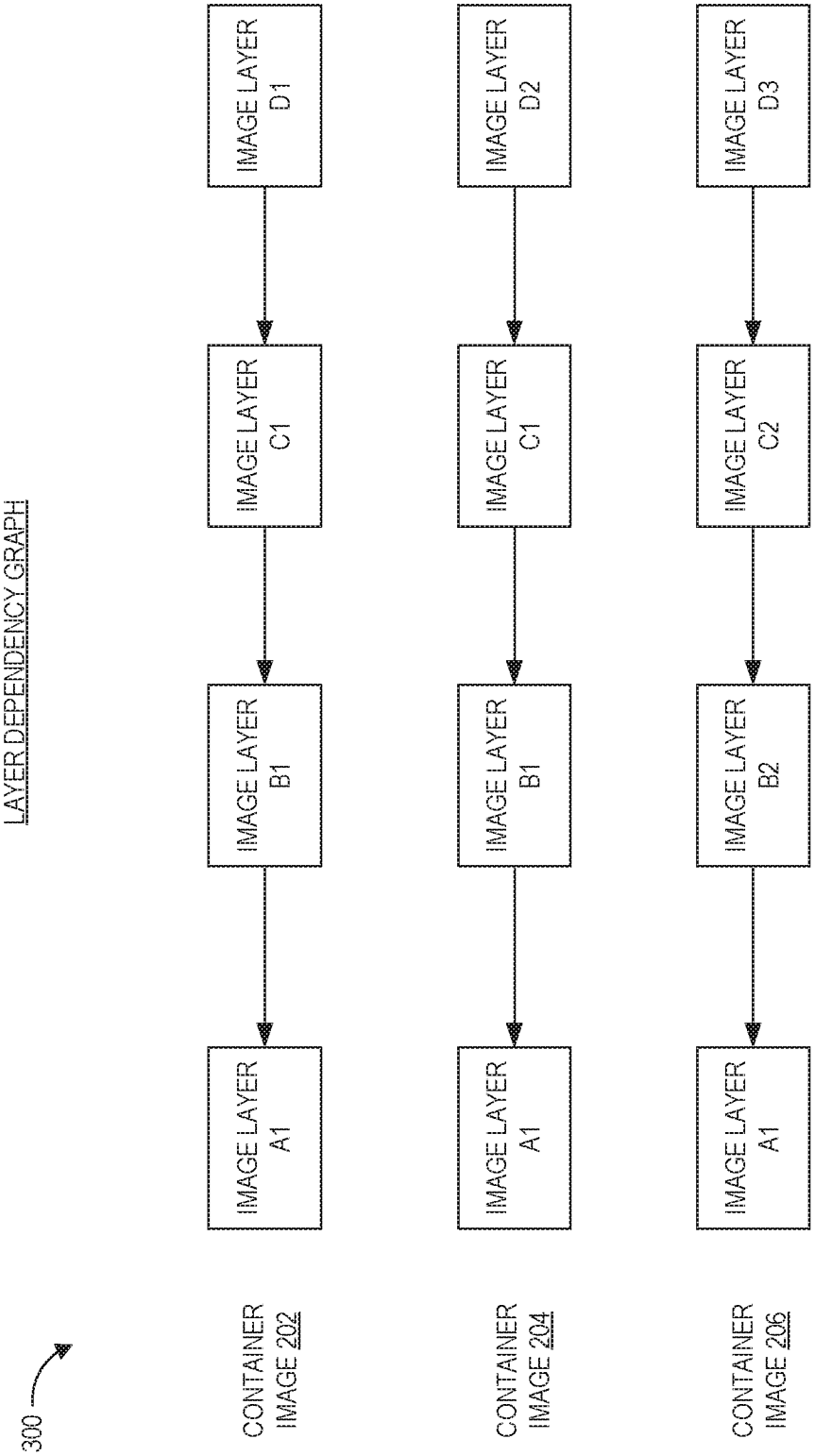
FIG. 3 depicts a diagram of example layer dependency graphs of a set of container images in accordance with aspects of the present disclosure.
Figure 4:
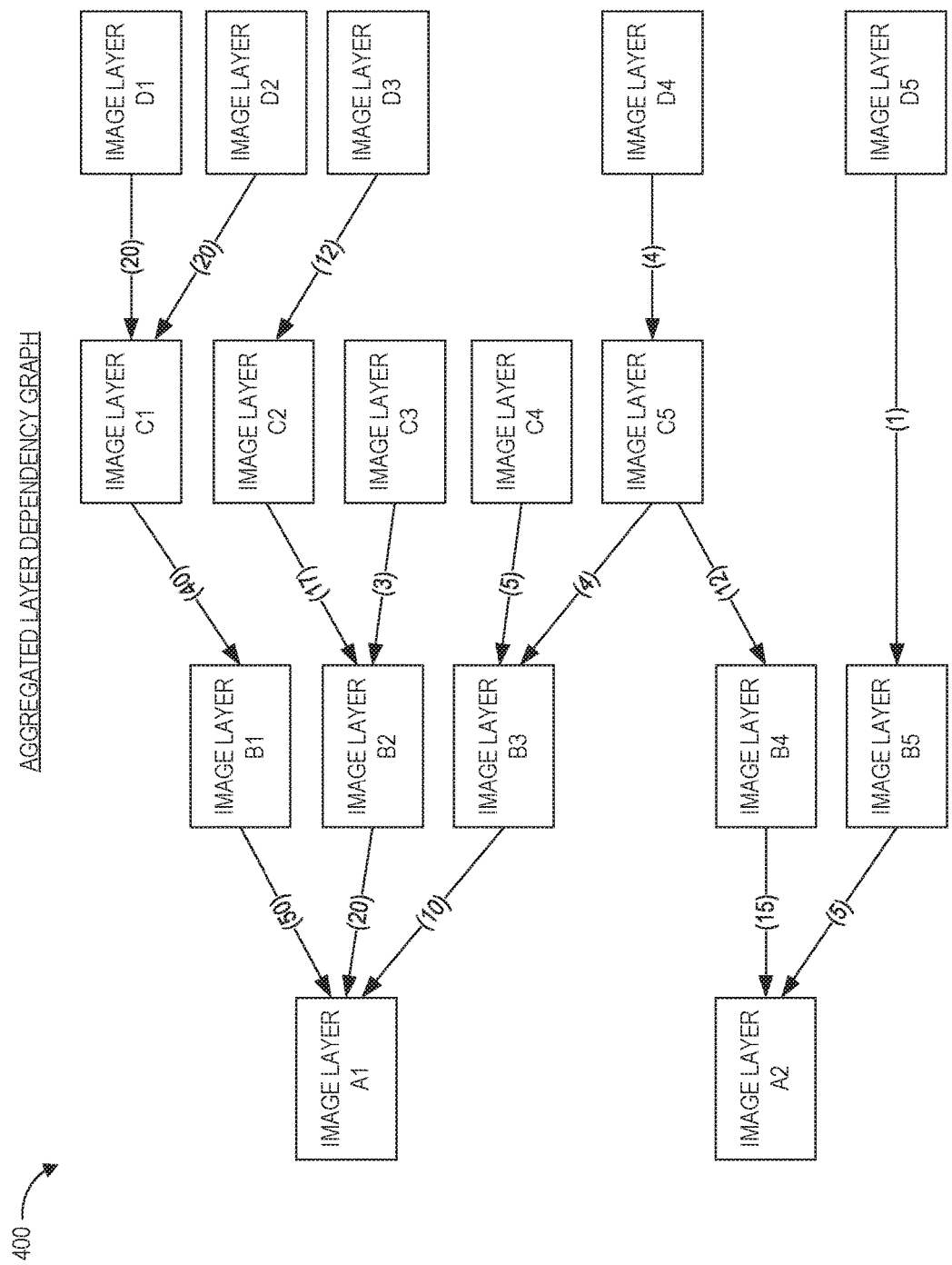
FIG. 4 depicts a diagram of an example aggregated layer dependency graph in accordance with aspects of the present disclosure.

In the example of FIG. 1, the container registry service 130 provides layer predelivery manager 131, repositories 132, image metadata 135, image analytics data 136, and layer dependency data 137. The layer predelivery manager 131 manages predelivery of the container image layers stored in the repositories 132 to the container service 140 and the additional services 170 and determines which layers should be delivered to which service/device at what time based on the image metadata 135, image analytics data 136, and/or the layer dependency data 137 and based on any requests from other services/devices to prefetch one or more of the layers. The repositories 132 store container images 134, including the bits corresponding to the layers that make up the container images 134. The image metadata 135 associated with a container image may specify details about the container image and the runtime environment in which the container image is to be executed including, but not limited to, the image ID, tag, and/or digest that can be used to identify the container image, image path, image version, author, architecture, operating system, image size, layer size, network host/domain/user names exposed network ports, expected resource allocations (CPU, memory, disk, network), layer identifiers, layer hash values, and any other parameters specified by the user who uploaded the container image onto the container registry service 130 at the time of uploading the container image (or a public repository within or external to the cloud network provider 120). The image analytics data 136 may indicate certain metadata about the container images 134 such as the frequency at which each of the container images 134 has been accessed from the respective one of the repositories 132, the recency of such access, dependencies between the container images (e.g., how frequently a given set of container images are loaded/executed together), availability of container images (currently or over time), availability of repositories (currently or over time), the geographic regions from which each of the container images 134 has been accessed, the services (e.g., container service 140, additional service 170, etc.) by which each of the container images 134 has been accessed, and the like. The layer dependency data 137 may indicate the dependencies (e.g., whether a layer depends on another layer, whether a layer builds on top of another layers, etc.) among the layers of a single container image (e.g., in the form of a directed graph, as shown in FIG. 3) and/or an aggregation of such dependencies across some or all of the container images stored in the repositories 132 (e.g., in the form of an aggregated directed graph, as shown in FIG. 4).

In some embodiments, the image metadata 135, image analytics data 136, and/or the layer dependency data 137 may include information corresponding to container images and/or layers stored in another image repository different from the repositories 132. Such image repository may reside within the cloud provider network 120 or may be external to the cloud provider network 120.

The container service 140 provides a layer prefetching manager 142, a cluster 146, and additional clusters 160. The layer prefetching manager 142 manages cache performance data 144 that indicates the performance of the cache 152 such as cache hit ratio, cache miss ratio, identity of layers resulting in cache hits, identity of layers resulting in cache misses, identity of container images resulting in cache hits, identity of container images resulting in cache misses, identity of prefetched layers and their percentages of being accessed from the cache, and identity of prefetched container images and their percentages of being accessed from the cache. The cache performance data 144 can be used to improve the prefetching algorithm utilized by the layer prefetching manager 142. For example, if a particular layer has been requested over a threshold number of times and the layer is never in the cache, the layer prefetching manager 142 may adjust the prefetching algorithm such that the layer is prefetched into a greater number of compute instances (for future execution requests). As another example, if a layer that is prefetched into the caches of compute instances is accessed less than a threshold percentage of times, the layer prefetching manager 142 may adjust the prefetching algorithm such that the layer is prefetched into a fewer number of compute instances (for future execution requests). Although the cache performance data 144 is shown as being managed by the container service 140, in other embodiments, the container registry service 130 or another service within the cloud provider network 120 manages such cache performance data, and the container service 140 accesses the cache performance data prior to prefetching one or more layers into the cache 152. The techniques for prefetching and managing container image layers are described in greater detail below with reference to FIGS. 2-10. Although the additional instances clusters 160 are shown in FIG. 1, in other embodiments, the container service 140 may include only a single cluster.

The cluster 146 includes an instance 148 and additional instances 158. The instance 148 includes a container agent 150 configured to perform operations on behalf of the instance 148, cache 152 storing container image layers 154, and tasks 156 executing on the instance 148. Although the additional instances 158 are shown in FIG. 1, in other embodiments, the cluster 146 may include only a single instance. Although some embodiments of the present disclosure are described with reference to the instances 148 and the additional instances 158 that are part of the cloud provider network 120, in other embodiments, the techniques described herein are applied to one or more instances that are outside the cloud provider network 120 (e.g., implemented using the user computing devices 102 and/or other on-premises computing resources). In some embodiments, the container images and/or the container image layers described herein are cached at the instance layer (e.g., in the example of virtual machines). In other embodiments, the container images and/or the container image layers described herein are cached below the virtualization layer such as at the underlying hardware layer (e.g., in the example of bare-metal instances).

The additional services 170 include storage devices 172 through storage devices 172N, which include layers 174 through layers 174N, respectively. The layers 174-174N may include layers prefetched from the container registry service 130 in anticipation of future execution requests and/or layers fetched in response to execution requests and cached for future use. Although not shown in FIG. 1, the storage devices 172-172N may be accessed by additional compute resources or compute devices that are either within the cloud provider network 120 or outside the cloud provider network 120 (e.g., part of an on-premises environment of a user of the cloud provider network 120).

The container registry service 130, the container service 140, and the additional services 170 may provide a set of application programming interfaces ("APIs") that can be used by the users of the user computing devices 102 to add, modify, or remove compute capacity to the clusters, and/or request execution of user applications (e.g., tasks) on the clusters. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

A container image representing a containerized software application is often comprised of one or more "base" image layers which can be optionally "overlaid" with one or more user created layers. The base image layers, for example, typically include various types of commonly used software applications such as operating systems, database servers, web application frameworks, and so forth, upon which various types of user applications can be created. An example container image, for example, might include one base image layer including a popular operating system distribution, another base image layer including a popular open source database server, and a user may overlay those images with a custom container image including user created software that depends on the software contained in the underlying layers. Additional details relating to container images and container image layers are provided, for example, in U.S. application Ser. No. 16/217,454, filed Dec. 12, 2018, titled "SHARING PREPOPULATED CONTAINER IMAGE CACHES AMONG CONTAINER EXECUTION ENVIRONMENTS," which is incorporated herein by reference in its entirety.

In the context of some software container services, a task refers to a container, or multiple containers working together, running to execute the functionality of a software application or a particular component of that application. In some implementations, tasks can also include virtual machines, for example, virtual machines running within instance(s) hosting the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example, linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

In some implementations, customers of a cloud provider network 120 can deploy containers by managing clusters of compute instances that run container agents. In such implementations, customers manage scaling, monitoring, patching, and security of the compute instances, in addition to managing their containerized workload. In some implementations, customers of a cloud provider may deploy and scale containerized workloads automatically without having to manage the underlying computing resources, for example, via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of compute instances on behalf of the customer.

The traffic and operations of the cloud provider network 120 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The container registry service 130, the container service 140, and/or the additional services 170 may utilize the services provided by the compute service 115 to perform one or more of the techniques described herein (e.g., to provide the instances 148 and 158). The compute service 115 may include one or more servers which provide resizable computing capacity to users for building and hosting their software systems. The compute service 115 and associated control plane functionality can provide an elastic compute cloud service of the cloud provider network 120. Compute resources can be provided from the compute service 115 to customers via an elastic compute cloud service (referred to in various implementations as an elastic compute service, a virtual machines service, a computing cloud service, a compute engine, or a cloud compute service). Users can use the compute service 115 to launch as many virtual or physical computing environments, referred to as "instances," as they need. Instances 116 can have various configurations of processing power, memory, storage, and networking capacity depending upon user needs. The compute service 115 can also include computer storage for temporary data used while an instance is running; however, as soon as the instance is shut down this data is lost.

The cloud provider network 120 may provide the instances shown in FIG. 1 with varying computational and/or memory resources. In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. The instances 148 and 158 may include one or more of physical machines, virtual machines, containers, nodes, or other forms of virtual or physical compute units that are configured to execute one or more applications, or any combination thereof.

In some implementations, at least a subset of virtualization management tasks may be performed at one or more offloading cards so as to enable more of the processing capacity of the host to be dedicated to client-requested compute instances—e.g., cards connected via Peripheral Component Interconnect (PCI) or Peripheral Component Interconnect Express (PCIe) to the physical CPUs and other components of the virtualization host may be used for some virtualization management components. Such an offload card of the host can include one or more CPUs and/or other computing resources that are not available to customer instances, but rather are dedicated to instance management tasks such as virtual machine management, input/output virtualization to network-attached storage volumes, local migration management tasks, instance health monitoring, and the like. Alternatively or additionally, such an offload card may provide additional computing resources usable by customer instances.

As used herein, provisioning an instance generally includes reserving resources (e.g., computational and memory resources) of an underlying physical machine for the client (e.g., from a pool of available physical machines and other resources), installing or launching required software (e.g., an operating system), and making the instance available to the client for performing tasks specified by the client.

Additionally, the container registry service 130 and/or the container service 140 may utilize the services provided by the object storage service 110 to perform one or more of the techniques described herein (e.g., to provide the repositories 132, to store the image METADATA 135, image analytics data 136, and layer dependency data 137, and to store the cache performance data 144). The object storage service 110 represents another type of storage within the cloud provider network 120. The object storage service 110 and associated control plane functionality can provide an object-based storage service of the cloud provider network 120. Object-based storage services can be referred to as a blob storage service, cloud object storage service, or cloud storage service, in various implementations. The object storage service 110 include one or more servers on which data is stored as objects within resources referred to as buckets 111. Each object typically includes the data being stored, a variable amount of metadata that enables various capabilities for the object storage service 110 with respect to analyzing a stored object, and a globally unique identifier or key that can be used to retrieve the object. Objects stored on the object storage service 110 are associated with a unique identifier, such that authorized access to them can be obtained through requests from networked computing devices in any location.

Each bucket 111 is associated with a given user account. Users can store as many objects as desired within their buckets, can write, read, and delete objects in their buckets, and can control access to their buckets and the objects contained therein. For example, the instances 116 may access the buckets 111 to write, read, or delete the objects contained therein. Further, in embodiments having a number of different object storage service 110 distributed across different ones of the regions described above, users can choose the region (or regions) where a bucket is stored, for example, to optimize for latency. Users can use object storage service 110 for purposes such as storing photos on social media websites, songs on music streaming websites, or files in online collaboration services, to name a few examples. Applications developed in the cloud often take advantage of the vast scalability and metadata characteristics of the object storage service 110. The object storage service 110 can support highly parallel data accesses and transfers.

Some implementations of the cloud provider network 120 can additionally include block store servers, domain name services ("DNS") servers, relational database servers, and other server configurations (not illustrated) for supporting on-demand cloud computing platforms. Each server (or service illustrated in FIG. 1) includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can be formed as a number of regions, where a region is a separate geographical area in which the cloud provider clusters data centers. Each region can include two or more availability zones connected to one another via a private high speed network, for example, a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 120 can provide on-demand, scalable computing platforms to users through the network 104, for example, allowing users to have at their disposal scalable physical and/or virtual computing devices via their use of the clusters 146 and 160 and/or the instances 116, 148, and 158 illustrated in FIG. 1. These computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

As illustrated in FIG. 1, the cloud provider network 120 can communicate over the network 104 with the user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The user computing devices 102 can include any network-equipped computing device, for example, desktop computers, laptops, smartphones, tablets, e-readers, gaming consoles, and the like. The user computing devices 102 can also include or can be integrated into industrial equipment, farm machinery, home appliances, manufacturing devices, industrial printers, automobiles, thermostats, sensor devices, smart traffic lights, vehicles, buildings, and the like. Users can access the cloud provider network 120 via the network 104 to view or manage their data and computing resources, as well as to use websites and/or applications hosted by the cloud provider network 120.

The cloud provider network 120 may implement various computing resources or services, which may include a virtual compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider network 120, in contrast to resources requested by users of the cloud provider network 120, which may be provisioned in user accounts. The disclosed techniques for prefetching and managing container image layers can be implemented as part of a virtual compute service, container service, or Kubernetes-based container service in some embodiments.

Sharing of Layers by Multiple Containers

Figure 2:
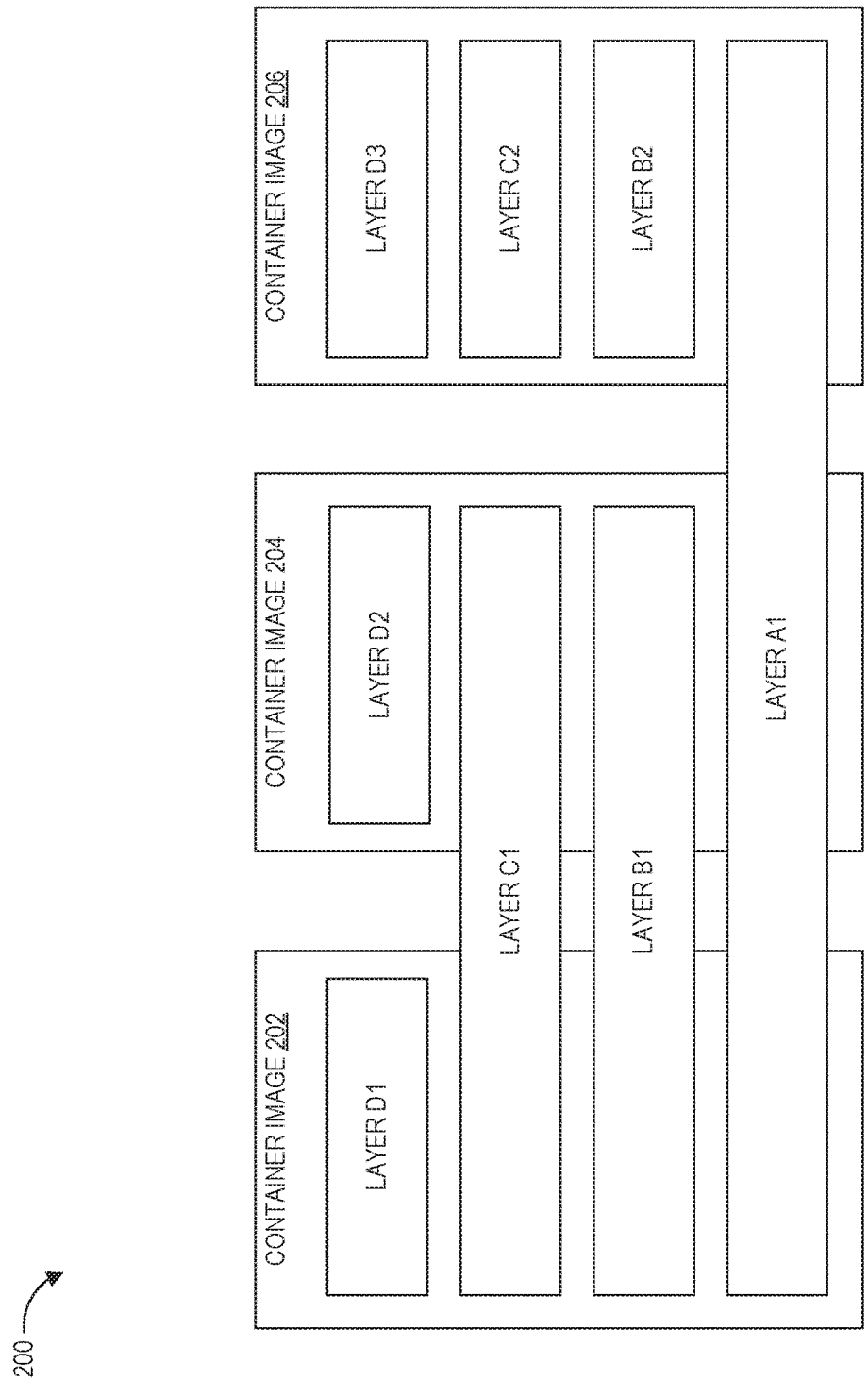
FIG. 2 depicts a diagram of a set of container images sharing container image layers in accordance with aspects of the present disclosure.

FIG. 2 is a diagram illustrating multiple containers sharing one or more container image layers according to some embodiments. As shown in FIG. 2, a container execution environment 200 includes three separate containers 202-206 sharing one or more container images layers. Each of the container image layers shown in FIG. 2 may be a read-only layer (e.g., immutable portion of the container image on top of which other layers build) or a readable-writable layer (e.g., additional code that makes changes to the immutable portion of the container image). For example, layers A1, B1, B2, C1, and C2 may be read-only layers and layers D1, D2, and D3 may be readable-writable layers.

The read-only layer A1, for example, may include operating system software that is used by each of the containers 202-206. In this example, only a single copy of the read-only layer A1 202 is used to support execution of each of the container images 202-206, which can significantly decrease the storage and other resource demands used to support execution of the containers. As illustrated by read-only layers B1 and C1, some layers can be shared by some but not all the containers executing within the container execution environment 200. As further illustrated by read-only layers B2 and C2, some layers may be specific to individual containers and not shared.

Example Layer Dependency Graphs

FIG. 3 is a diagram illustrating example layer dependency graphs of the container images 202-206 in accordance with aspects of the present disclosure. Each layer of container images 202-206 builds on top of a previous layer, resulting in the layer dependency graphs shown in FIG. 3. As indicated by the first layer dependency graph of FIG. 3, in the container image 202, image layer D1 depends on (e.g., builds on top of) image layer C1, which depends on image layer B1, which depends on image layer A1. As indicated by the second layer dependency graph of FIG. 3, in the container image 204, image layer D2 depends on image layer C1, which depends on image layer B1, which depends on image layer A1. As indicated by the third layer dependency graph of FIG. 3, in the container image 206, image layer D3 depends on image layer C2, which depends on image layer B2, which depends on image layer A1.

If a large number of layers across multiple container images depend on a particular layer (e.g., image layer A1 in the example of FIG. 3), such layer has a high likelihood of being used as part of executing container images on the cloud provider network 120, and accordingly, prefetching such layer may eliminate or reduce the need to download such layer from a remote repository at runtime, thereby reducing the application launch time.

Example Aggregated Layer Dependency Graph

FIG. 4 is a diagram illustrating an example aggregated layer dependency graph 400 in accordance with aspects of the present disclosure. In the example of FIG. 4, the numbers in the parentheses indicate the number of instances a given dependency is observed across all container images stored on the cloud provider network 120 (e.g., including the container images 202-206 shown in FIG. 3). The aggregated layer dependency graph 400 indicates that image layer A1 appeared as a dependent base layer in 80 instances (50 times with image layer B1, 20 times with image layer B2, and 10 times with image layer B3), and that image layer A2 appeared as a dependent base layer in 20 instances (15 times with image layer B4 and 5 times with image layer B5). Using the information provided by the aggregated layer dependency graph 400 (and other information such as how frequently the layers were accessed, how recently the layers were accessed, from which geographical regions the layers were accessed, and the sizes of the layers), the layer fetching manager 142 may prefetch one or more of the layers to reduce the application launch times. For example, a layer that appears in only one container image may warrant prefetching if the layer is sufficiently frequently accessed (e.g., used as part of executing a user application). As another example, a layer that appears in a large number of container images may not warrant prefetching if the layer was most recently accessed 6 months ago. As another example, a layer that appears in a large number of container images that were accessed by services/devices in a particular geographic region may warrant being predelivered onto a remote storage device in that geographic region, but may not warrant being predelivered onto a remote storage device in another geographic region from which only a small number of container images that include the layer were accessed. As yet another example, the layer fetching manager 142 may favor a slightly less popular layer based on the size of the layer being sufficiently large (which would result in a greater amount of time savings in the event of a cache hit).

Although in the example of FIG. 4, the aggregated layer dependency graph 400 is described as reflecting the dependencies across the entire cloud provider network 120, in other embodiments, the scope of the aggregated layer dependency graph 400 may be limited to the container registry service 103, to a particular repository 132, to a single user or user account on the cloud provider network 120, or to another level of granularity appropriate for performing the layer prefetching techniques described herein.

Example Workflow for Prefetching Container Image Layers

Figure 5A:
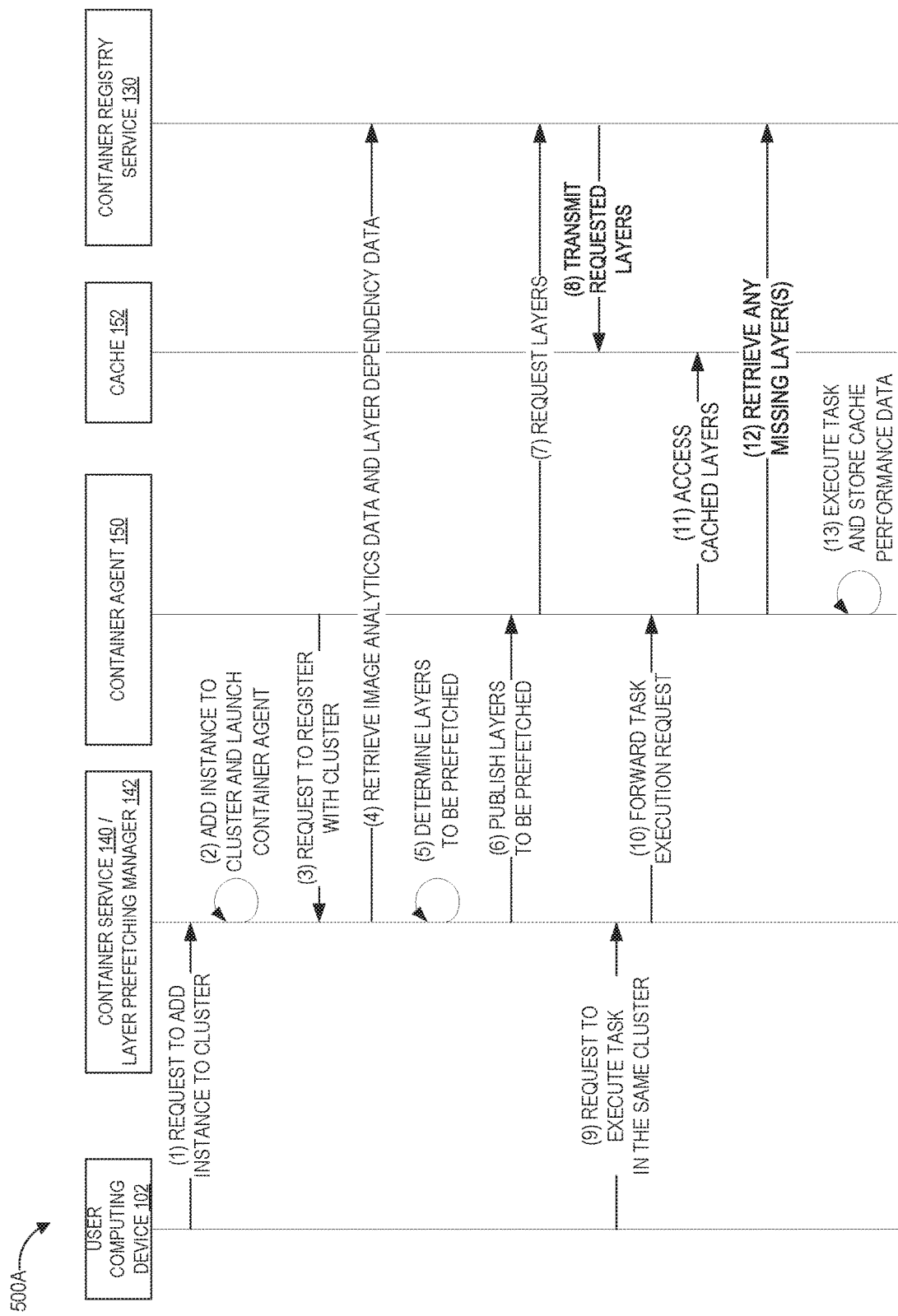
FIG. 5A is a workflow diagram illustrating the interactions among the various components shown in FIG. 1 in prefetching container image layers in accordance with aspects of the present disclosure.

FIG. 5A depicts interactions among the various components shown in FIG. 1 in prefetching container image layers in accordance with aspects of the present disclosure. As shown in FIG. 5A, at (1), the user computing device 102 calls an API provided by the container service 140 to request to add a compute instance (e.g., instance 148 of FIG. 1) to a cluster (e.g., cluster 146 of FIG. 1), where the compute instance and the cluster are both assigned to the user associated with the user computing device 102. At (2), the container service 140 adds the instance to the cluster and launches a container agent 150 on the instance.

At (3), the container agent 150 sends, to the container service 140 (or a control plane component thereof), a request to register itself with the cluster as available capacity. At (4), in response to the request from the container agent 150, the container service 140 retrieves image analytics data and layer dependency data from the container registry service 130. At (5), the container service 140 determines layer to be prefetched onto the cache of the compute instance, and at (6), the container service 140 publishes the layers to the container agent 150 to be prefetched. At (7), the container agent 150 sends a request to the container registry service 130 to prefetch the layers indicated by the container service 140. In response to the request from the container agent 150, the container registry service 130 transmits the requested layers, which are stored in the cache 152 of the compute instance on which the container agent 150 is running.

After the layers have been prefetched into the cache 152, at (9), the user computing device 102 calls another API provided by the container service 140 to request to execute a task in the cluster, where the task includes the container images that include one or more of the layers prefetched into the cache 152 (e.g., as indicated by the task definition associated with the request). At (10), the container service 140 forwards the task execution request to the container agent 150. In response, at (11), the container agent 150 accesses the prefetched layers from the cache 152. Although not illustrated in FIG. 5A, cache validation may be performed as part of (11). Such cache validation may include reading a layer from the cache 152, requesting a hash value of the layer from the container registry service 130, and comparing the hash value of the layer read from the cache 152 and the hash value received from the container registry service 130. If the hash values match or otherwise correlate, it is determined that the layer in the cache 152 has not been tampered with and is safe to be used. If the hash values do not match or otherwise correlate, a new copy of the layer is requested from the container registry 130 and used to execute the task requested at (9). In other embodiments, other known cache validation algorithms may be used. At (12), the container agent 150 retrieves any missing layer(s) from the container registry service 130. For example, some but not all of the required layers may be present in the cache 152 at the time the request is received at (9), and the remaining layers may be downloaded from the container registry service 130. At (13), the container agent 150 causes the container images to be executed on the compute instance using the layers accessed from the cache 152 and/or from the container registry service 130.

As illustrated, by allowing the layers to be prefetched into the cache of the compute instance that is subsequently tasked with executing container images containing those layers, the container service 140 reduces the launch time associated with the execution of the container images.

Example Workflow for Predelivering Container Image Layers

Figure 5B:
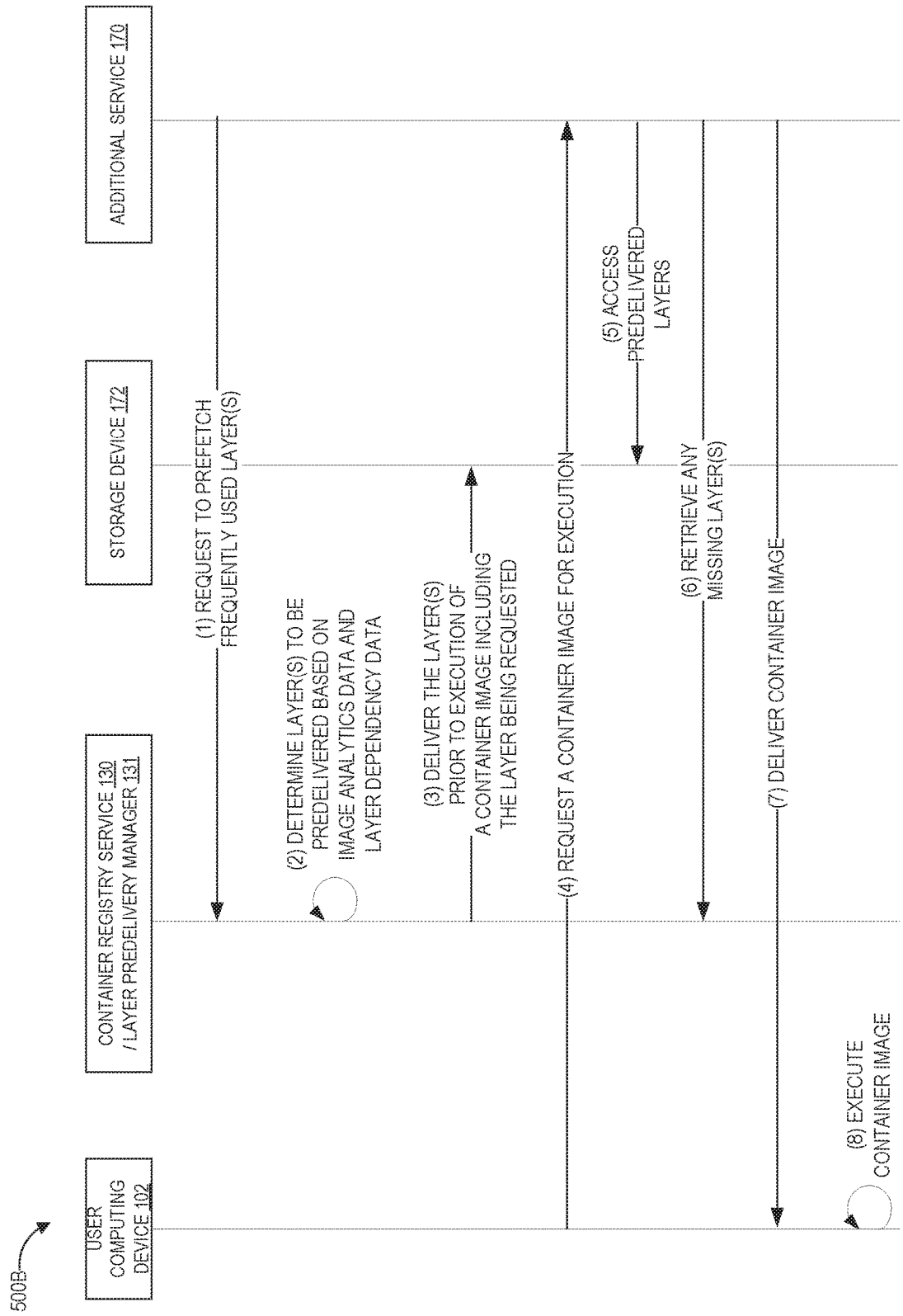
FIG. 5B is a workflow diagram illustrating the interactions among the various components shown in FIG. 1 in predelivering container image layers in accordance with aspects of the present disclosure.

FIG. 5B depicts interactions among the various components shown in FIG. 1 in predelivering container image layers in accordance with aspects of the present disclosure. As shown in FIG. 5B, at (1), the additional service 170 requests to prefetch one or more frequently used layers from the container registry service 130. At (2), the container registry service 130 determines, based on image analytics data and layer dependency data described herein, one or more layers to be predelivered to the additional service 170. At (3), the container registry service 130 delivers the determined layer(s) to the storage device 172, prior to the execution of a container image including the layer(s) being requested (e.g., by the user computing device 102). At (4), the user computing device 102 requests a container image for executing the container image on the user computing device 102. At (5), the additional service 170 identifies the layers included in the container image and accesses, from the storage device 172, one or more of the layers that have been predelivered onto the storage device 172. At (6), the additional service 170 retrieves any missing layer(s) from the container registry service 130. At (7), the additional service 170 delivers the container image requested at (4). At (8), the user computing device 102 executes the container image.

In some embodiments, the additional service 170, the storage device 172, and the user computing device 102 are located in close proximity to each other but far away from the container registry service 130. Thus, by predelivering one or more container images layers that are likely to be needed by the additional service 170 and/or the user computing device 102 onto the storage device 172 before such need arises, the latency associated with having to download the container image layers from the container registry service 130 at runtime can be reduced.

For example, as described herein, a cloud provider network can be formed as a number of regions, where each region represents a geographical area in which the cloud provider clusters data centers. Each region can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to an AZ of the cloud provider network via a publicly accessible network (e.g., the Internet, a cellular communication network).

The AZs may include certain computing resources that are sometimes referred to as "edge locations" in that they are closer to the "edge" where end users connect to a network than computing resources in a centralized data center. Such edge locations may include one or more networked computer systems that provide customers of the cloud provider network with computing resources to serve end users with lower latency than would otherwise be achievable if those compute instances were hosted in a data center site. An edge location deployed in a communication service provider network may also be referred to as a "wavelength zone" (e.g., network resource connected to a 5G network provided by a cellular carrier).

An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

The cloud provider network can include components for programmatically assigning edge locations to particular regions (e.g., based on a time required for communications between the region and the edge location) and for grouping similar edge locations (e.g., edge locations that are: attached to the same third party network, outposts of the same customer, have a certain latency range to a target geography, etc.) together to form an availability group. The particular edge locations included in an availability group may be dynamically updated as new edge locations are added, as existing edge locations are modified (e.g., as their capacity is filled or released, as their latency in communications back to the region or to end users change), or as latency criteria are modified.

In some embodiments, each availability zone generally includes a set of provider substrate extension locations having a defined set of characteristics and capabilities. For example, one availability zone might represent cloud provider-managed provider substrate extensions in the Los Angeles area, while another availability zone might represent provider substrate extensions in the Austin area that are located in facilities associated with one or more communications service providers (e.g., and thus may provide low latency access to users of a 5G network in the area), and so forth.

Additional details relating to the edge locations and the services and devices to which container image layers can be predelivered and details regarding the content delivery network that the container registry service 130 may utilize to predeliver the container image layers are provided, for example, in U.S. application Ser. No. 16/699,309, filed Nov. 29, 2019, titled "AVAILABILITY GROUPS OF CLOUD PROVIDER EDGE LOCATIONS," U.S. Pat. No. 9,549, 038, filed Aug. 14, 2013, titled "CACHEABLE RESOURCE LOCATION SELECTION," and U.S. Pat. App. Pub. No. 2017/0078433, filed Sep. 11, 2015, titled "CUSTOMIZABLE EVENT-TRIGGERED COMPUTATION AT EDGE LOCATIONS," the disclosures of which are incorporated herein by reference in their entirety.

Example Pool of Compute Instances

Figure 6:
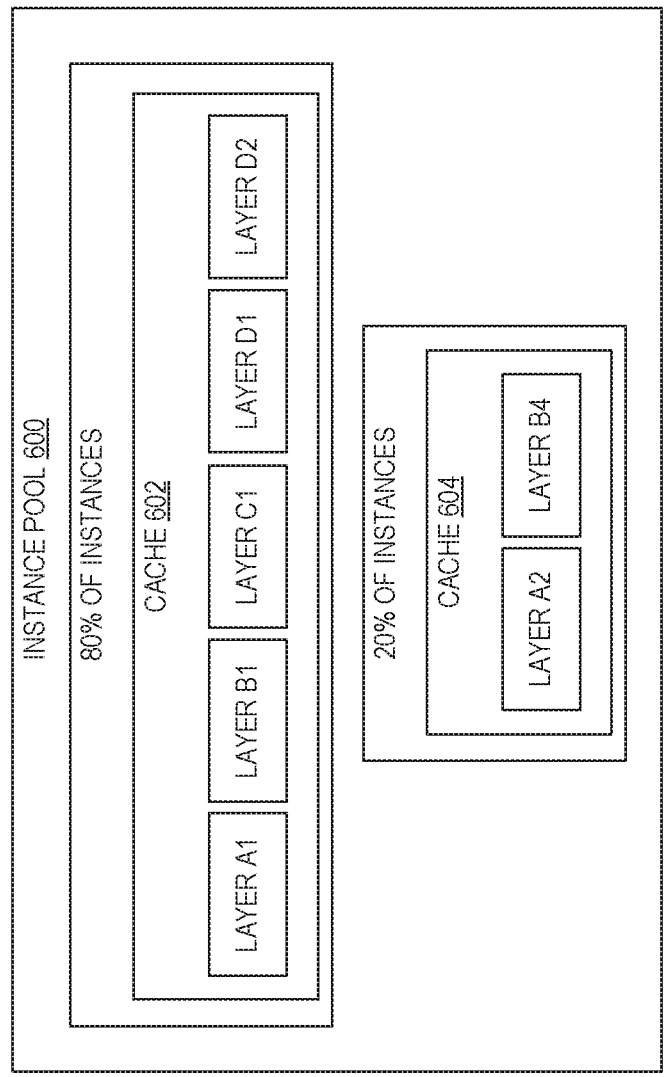
FIG. 6 depicts a diagram of an instance pool with prefetched container image layers in accordance with aspects of the present disclosure.

FIG. 6 is a diagram illustrating an example instance pool 600 including compute instances that have not yet been assigned to a particular task or a particular user of the cloud provider network 120 but can be used to handle any future task execution on behalf of any user. In the example of FIG. 6, certain layers have been prefetched onto the caches of the compute instances based on the image analytics data 136, the layer dependency data 137, and/or the cache performance data 144. For example, 80% of the instances in the instance pool 600 have layers A1, B1, C1, D1, and D2 prefetched onto their cache 602, and 20% of the instances in the instance pool 600 have layers A2 and B4 prefetched onto their cache 604.

For example, when the container service 140 receives a request to execute an application including a container image that requires layer A1, such a request may be sent to one of the 80% of the instances in the instance pool 600 to utilize the copy of layer A1 preloaded into its cache. As another example, when the container service 140 receives a request to execute an application including a container image that requires layer A2, such a request may be sent to one of the 20% of the instances in the instance pool 600 to utilize the copy of layer A2 preloaded into its cache. Over time, the makeup and availability of the instances in the instance pool 600 may change based on the current workload of the container service 140 and based on any changes made to the image analytics data 136, the layer dependency data 137, and/or the cache performance data 144.

Example Routine for Processing a Newly Uploaded Container Image

Figure 7:
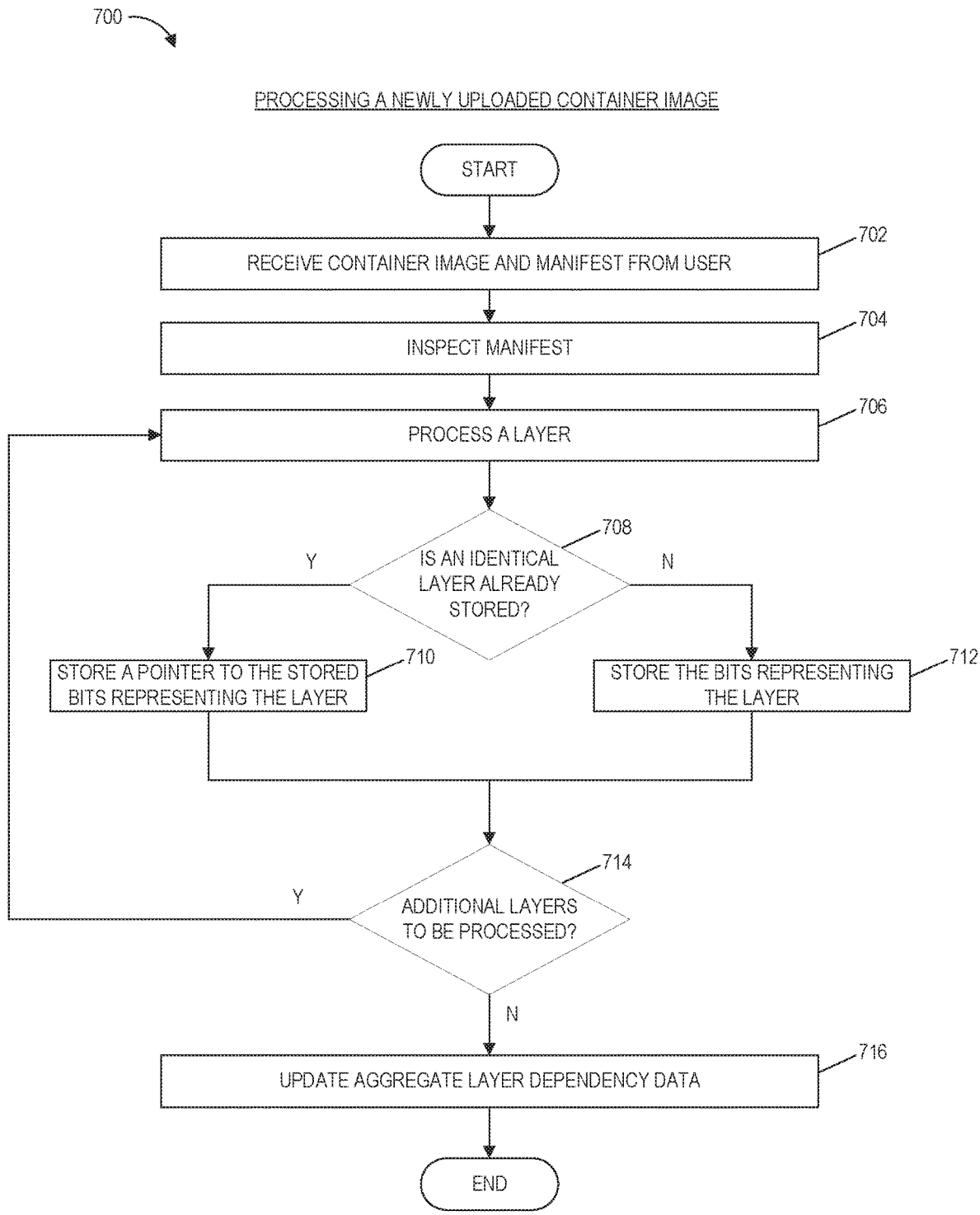
FIG. 7 is a flowchart of an example process for processing a newly uploaded container image in accordance with aspects of the present disclosure.

FIG. 7 depicts an illustrative routine 700 for processing a newly uploaded container image in accordance with aspects of the present disclosure. The routine 700 may be carried out, for example, by the container registry service 130 or one or more other components of the cloud provider network 120 described herein (e.g., the container service 140). For convenience, some or all of the steps of the routine 700 are described as being performed by the container registry service 130. For example, the container registry service 130 may include one or more hardware computing devices and non-transitory physical computer storage storing instructions that, when executed by the one or more hardware computing devices, cause the one or more hardware computing devices to perform the steps of the routine 700.

The routine 700 begins at 702, where the container registry service 130 receives a container image and a manifest associated with the container image from a user. For example, the user may upload the container image and the manifest onto the container registry service 130 so that the user can subsequently request execution of the container image on the container service 140.

At block 704, the container registry service 130 inspects the manifest associated with the container image. For example, the manifest may specify details about the container image and the runtime environment in which the container image is to be executed including, but not limited to, the image ID, tag, and/or digest that can be used to identify the container image, image path, image version, author, architecture, operating system, size, network host/domain/user names exposed network ports, expected resource allocations (CPU, memory, disk, network), layer identifiers, layer hash values, and any other parameters specified by the user who uploaded the container image onto the container registry service 130 at the time of uploading the container image (or a public repository within or external to the cloud network provider 120).

At block 706, the container registry service 130 processes a layer included in the container image. If the manifest indicates that the container image includes multiple layers, the container registry service 130 may process the layers one at a time.

At block 708, the container registry service 130 determines whether the processed layer is identical to another layer that is already stored by the container registry service 130. If the container registry service 130 determines that the processed layer is identical to another layer that is already stored by the container registry service 130, the routine 700 proceeds to block 710, where the container registry service 130 stores a pointer to the previously stored bits representing the layer that is identical to the processed layer. Otherwise, the routine 700 proceeds to block 712, where the container registry service 130 stores the bits representing the processed layer.

At block 714, the container registry service 130 determines whether there is an additional layer to be processed. If the container registry service 130 determines that there is an additional layer to be processed, the routine proceeds to block 706 and repeats blocks 706-714. Otherwise, the routine proceeds to block 716, where the container registry service 130 updates the aggregate layer dependency data to reflect the additional information provided by the manifest associated with the container image (e.g., to include the layer dependencies indicated by the manifest). The routine 700 may then end.

The routine 700 can include fewer, more, or different blocks than those illustrated in FIG. 7 and/or one or more blocks illustrated in FIG. 7 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Prefetching Layers for Pre-Assigned Compute Instances

Figure 8:
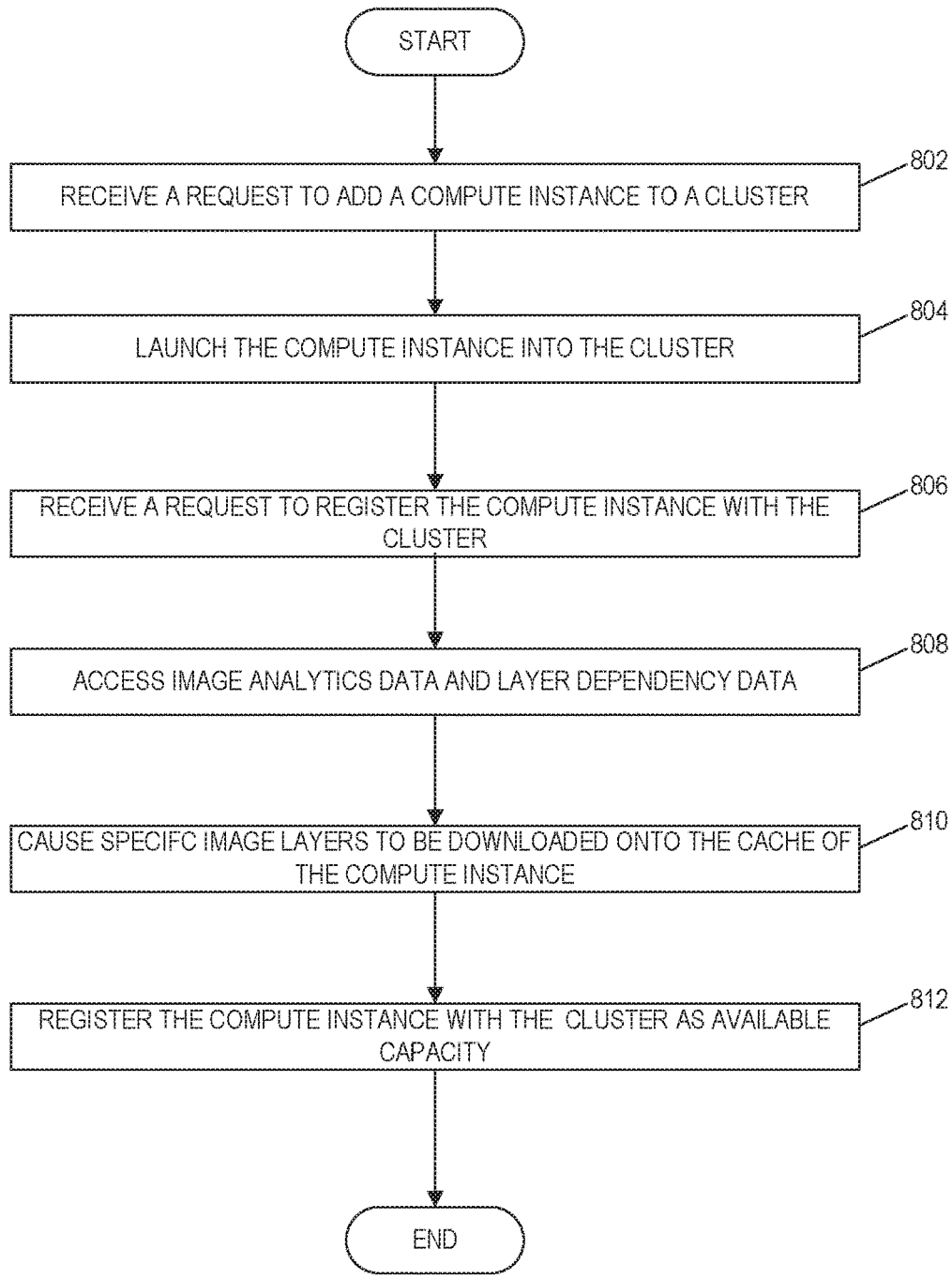
FIG. 8 is a flowchart of an example process for prefetching layers for pre-assigned compute instances in accordance with aspects of the present disclosure.

FIG. 8 depicts an illustrative routine 800 for prefetching container image layers for a pre-assigned compute instance in accordance with aspects of the present disclosure. Such a pre-assigned compute instance may already be assigned to a particular user or user group of the cloud provider network 120 and designated to handle requests from only such user or user group. The routine 800 may be carried out, for example, by the container service 140 (or a component thereof such as the layer prefetching manager 142) or one or more other components of the cloud provider network 120 described herein. For convenience, some or all of the steps of the routine 800 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 800.

The routine 800 begins at 802, where the container service 140 receives a request to add a compute instance to a cluster. For example, the compute instance may be assigned to a user of the cluster, and the cluster may be configured to execute one or more tasks on behalf of the user.

At block 804, the container service 140 launches the compute instance into the cluster. For example, the container service 140 may utilize a machine image provided by the user of the cluster to launch the compute instance.

At block 806, the container service 140 receives a request to register the compute instance with the cluster. For example, the request may be received from a container agent (e.g., container agent 150) running on the compute instance.

At block 808, the container service 140 accesses image analytics data and layer dependency data from the container registry service 130.

At block 810, the container service 140 causes certain image layers to be prefetched onto the cache of the compute instance.

At block 812, the container service 140 registers the compute instance with the cluster as available capacity. The compute instance may now be ready to be used as compute capacity for handling a task execution request on behalf of the cluster. For example, the container service 140 may keep track of which layers have been prefetched onto the cache of the compute instance, and when execution of a task that requires the prefetched layers is requested, the container service 140 may execute the task on the compute instance. The routine 800 may then end.

The routine 800 can include fewer, more, or different blocks than those illustrated in FIG. 8 and/or one or more blocks illustrated in FIG. 8 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Prefetching Layers for Unassigned Compute Instances

Figure 9:
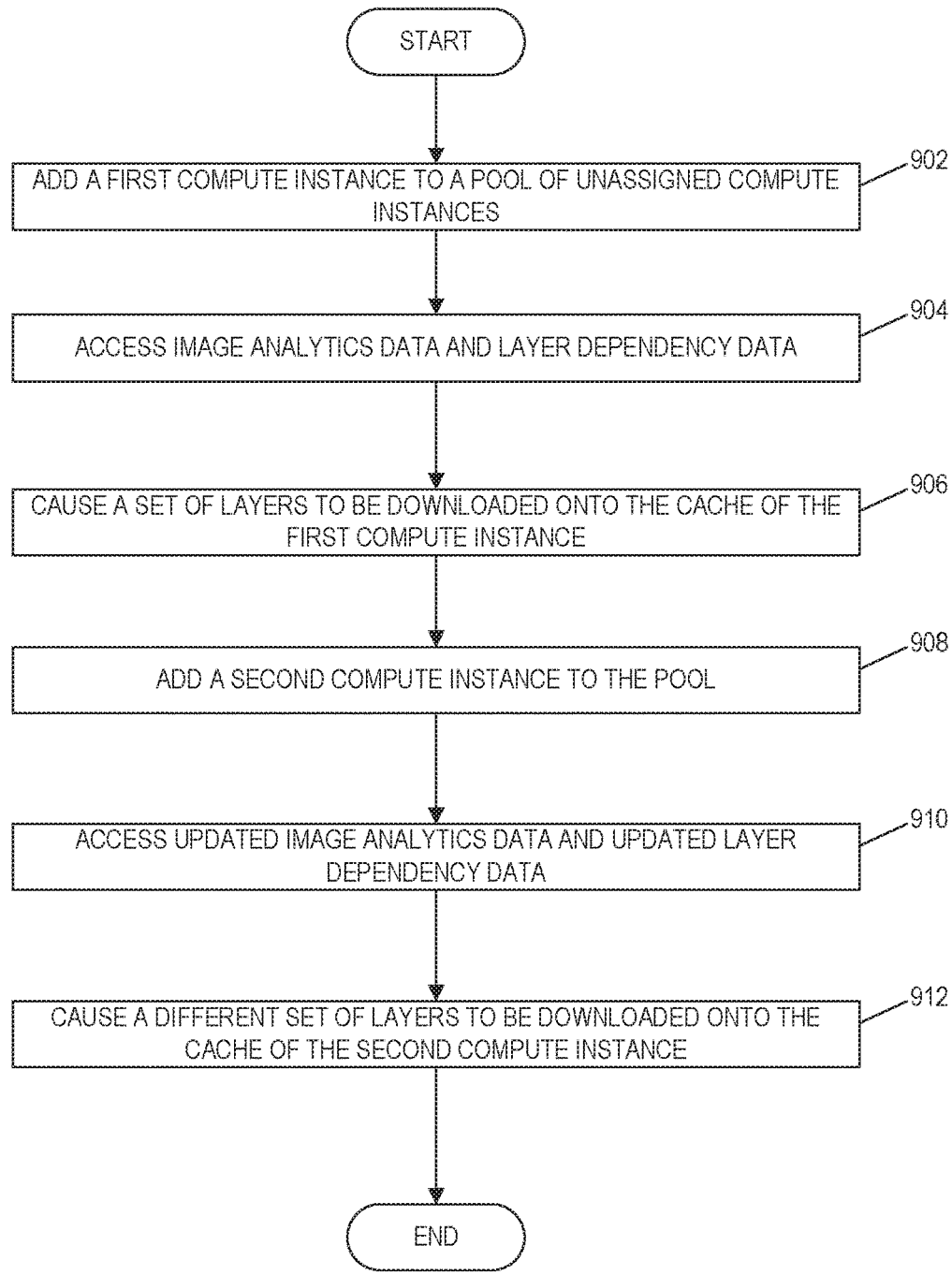
FIG. 9 is a flowchart of an example process for prefetching layers for unassigned compute instances in accordance with aspects of the present disclosure.

FIG. 9 depicts an illustrative routine 900 for prefetching layers for unassigned compute instances in accordance with aspects of the present disclosure. Such unassigned compute instances may not be assigned to any particular user or user group of the cloud provider network 120 and can be used by the container service 140 to handle requests from any user or user group of the cloud provider network 120. The routine 900 may be carried out, for example, by the container service 140 (or a component thereof such as the layer prefetching manager 142) or one or more other components of the cloud provider network 120 described herein. For convenience, some or all of the steps of the routine 900 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 900.

The routine 900 begins at 902, where the container service 140 adds a first compute instance to a pool of unassigned compute instances.

At block 904, the container service 140 accesses image analytics data and layer dependency data from the container registry service 130.

At block 906, the container service 140 causes, based on the image analytics data and layer dependency data, a set of image layers to be prefetched onto the cache of the first compute instance.

At block 908, the container service 140 adds a second compute instance to the pool of unassigned compute instances. For example, the container service 140 may replenish the pool with additional compute instances as compute instances are taken out of the pool to handle incoming task execution requests.

At block 910, the container service 140 accesses updated image analytics data and updated layer dependency data from the container registry service 130. For example, since adding the first compute instance to the pool, the image analytics data and layer dependency data may have been updated by the container registry service 130 to reflect the information provided by additional container images that were uploaded onto the container registry service 130 and/or to reflect additional executions of container images on the container service 140.

At block 912, the container service 140 causes, based on the updated image analytics data and updated layer dependency data, a different set of image layers to be prefetched onto the cache of the second compute instance. The routine 900 may then end.

The routine 900 can include fewer, more, or different blocks than those illustrated in FIG. 9 and/or one or more blocks illustrated in FIG. 9 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Executing a Task Using Prefetched Layers

Figure 10:
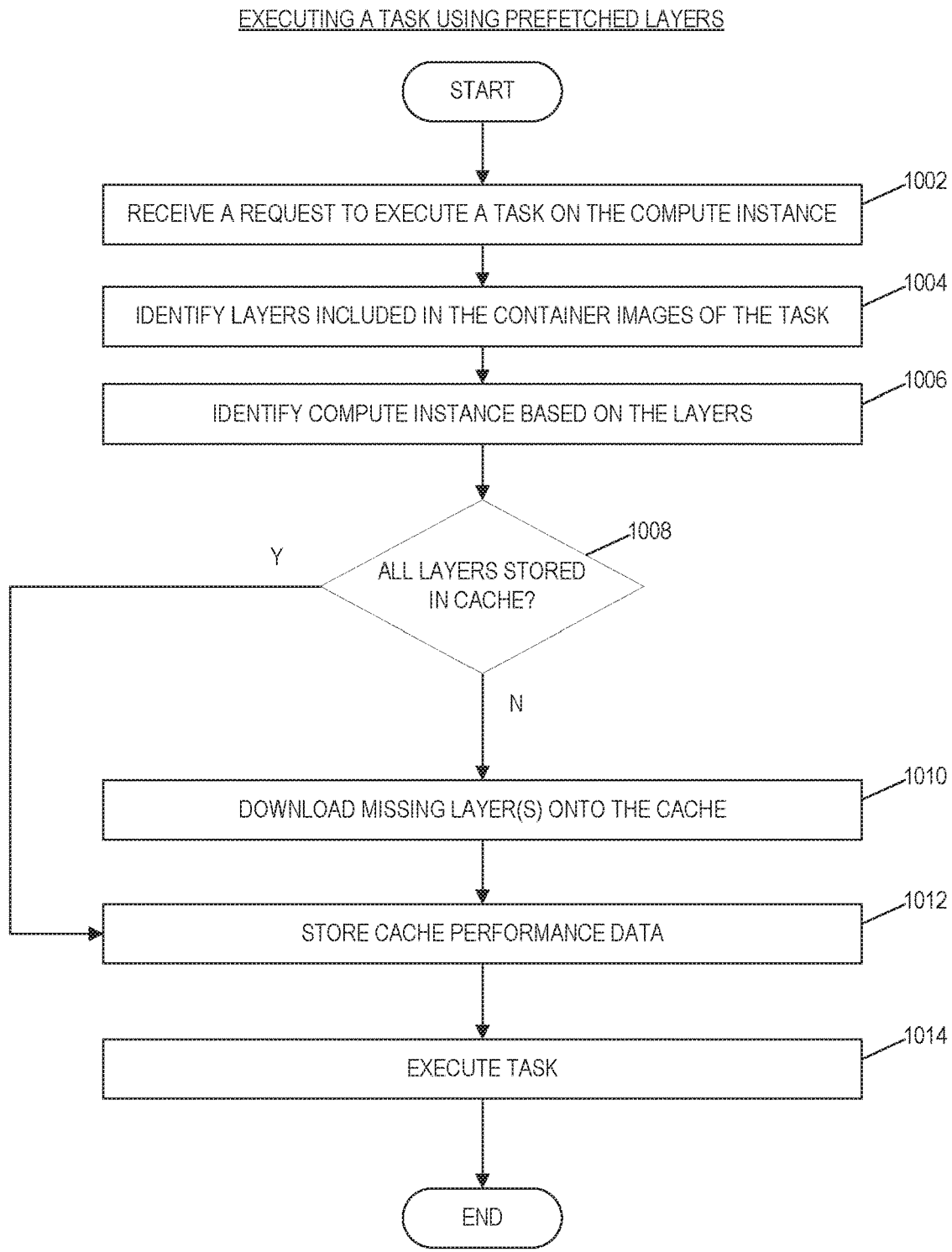
FIG. 10 is a flowchart of an example process for executing an incoming task using pre-cached layers in accordance with aspects of the present disclosure.

FIG. 10 depicts an illustrative routine 1000 for executing a task using prefetched layers in accordance with aspects of the present disclosure. The routine 1000 may be carried out, for example, by the container service 140 (or a component thereof such as the layer prefetching manager 142) or one or more other components of the cloud provider network 120 described herein. For convenience, some or all of the steps of the routine 1000 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 1000.

The routine 1000 begins at 1002, where the container service 140 receives a request to execute a task on a compute instance of the cloud provider network 120. The request may include a set of parameters (e.g., a task definition) indicating the one or more container images needed to execute the task.

At block 1004, the container service 140 identifies the layers needed to execute the task. For example, the container service 140 may determine the container images to be executed, based on the information provided in the request at block 1002, and access the manifests corresponding to the container images from the container registry service 130. The manifest associated with each of the container images may indicate the set of layers needed to execute the container image.

At block 1006, the container service 140 identifies a compute instance to be used to execute the task, based on the identification of the layers. For example, the container service 140 may determine which one of the available instances (e.g., in the cluster that belongs to the user submitting the request at block 1002, or in the pool of unassigned instances) includes some or all of the layers needed to execute the task, and the container service 140 may select the compute instance that would result in the lowest task launch time (e.g., based on the layers prefetched onto the cache and the sizes of the layers to be downloaded onto the cache).

At block 1008, the container service 140 determines whether all of the layers needed to execute the task have been prefetched onto the cache of the selected compute instance. If the container service 140 determines that all of the layers needed to execute the task have been prefetched onto the cache of the selected compute instance, the routine 1000 proceeds to block 1012. Otherwise, the routine 1000 proceeds to block 1010, where the container service 140 downloads the missing layer(s) onto the cache from the container registry service 130. Although not shown in FIG. 10, the container service 140 may also perform cache validation at block 1008 as described with reference to FIG. 5A, and if the cache validation does not pass, the routine 1000 may proceed to block 1010 instead of block 1012 even if the container service 140 determines at block 1008 that all of the layers have been prefetched.

At block 1012, the container service 140 stores the cache performance data, indicating, for example, which of the layers needed to execute the task were already stored in the cache, and which of the prefetched layers were not needed. Such cache performance data may be used to adjust the layer prefetching algorithm used by the container service 140.

At block 1014, the container service 140 causes the task to be executed on the compute instance using the prefetched layers and/or the downloaded layers. The routine 1000 may then end.

The routine 1000 can include fewer, more, or different blocks than those illustrated in FIG. 10 and/or one or more blocks illustrated in FIG. 10 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Predelivering a Layer to a Storage Device

Figure 11:
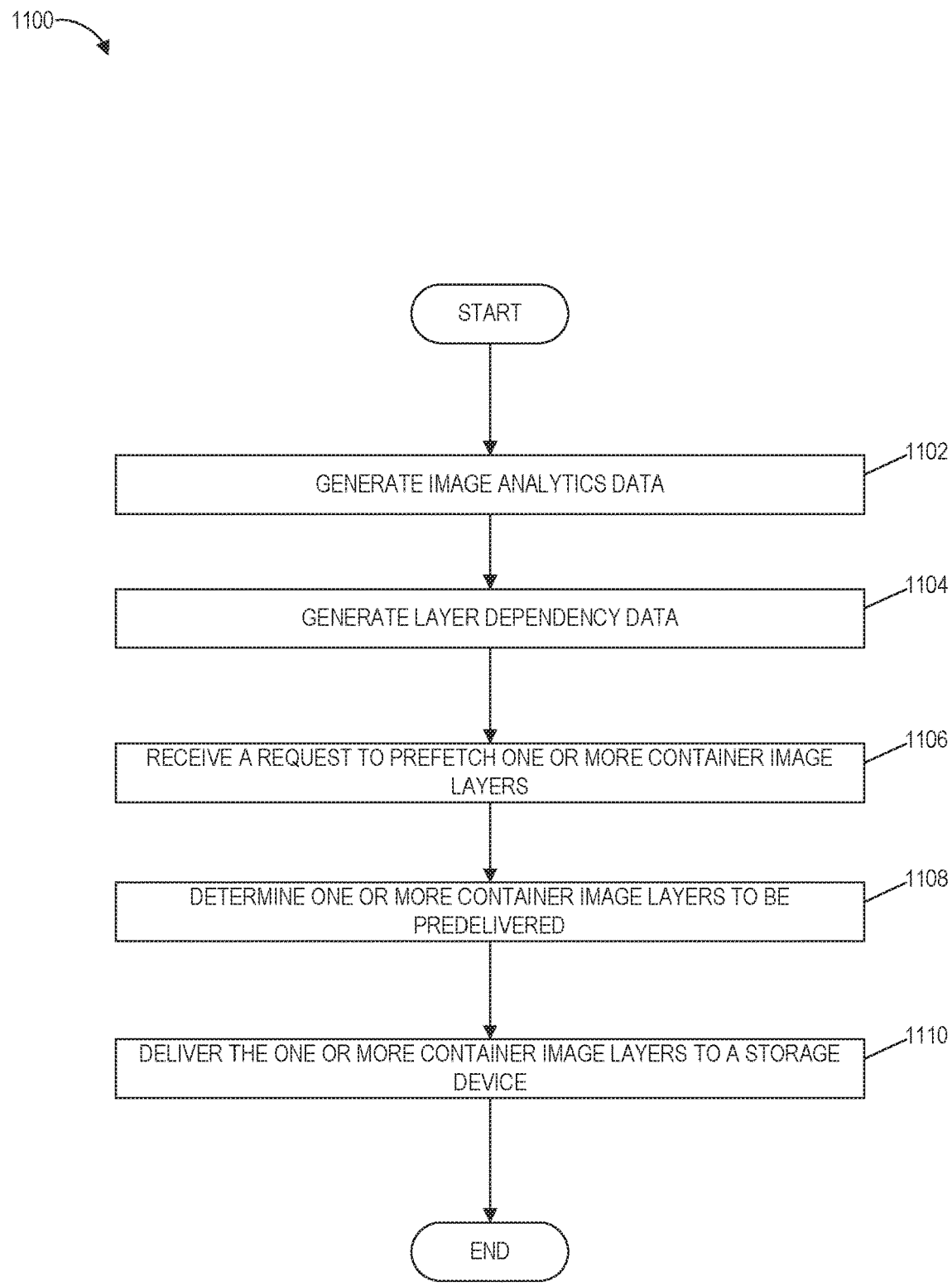
FIG. 11 is a flowchart of an example process for predelivering a layer to a storage device in accordance with aspects of the present disclosure.

FIG. 11 depicts an illustrative routine 1100 for predelivering a layer to a storage device in accordance with aspects of the present disclosure. The storage device may be located in an edge location accessible by a user device or compute resource that can execute user code stored in a remote repository such as the repository 132 of FIG. 1. The routine 1100 may be carried out, for example, by the container registry service 130 (or a component thereof such as the layer predelivery manager 131) or one or more other components of the cloud provider network 120 described herein. For convenience, some or all of the steps of the routine 1100 are described as being performed by the container registry service 130. For example, the container registry service 130 may include one or more hardware computing devices and non-transitory physical computer storage storing instructions that, when executed by the one or more hardware computing devices, cause the one or more hardware computing devices to perform the steps of the routine 1100.

The routine 1100 begins at 1102, where the container registry service 130 generates, based at least in part on access requests received from the container service, image analytics data indicating an access pattern associated with the plurality of container images. For example, based on the manner (e.g., frequency and/or recency) in which the container service 140 and/or the additional services 170 have been accessing the container images stored in the repositories 132, the container registry service 130 may generate the image analytics data 136.

At block 1104, the container registry service 130 generates, based at least in part on the plurality of container images, layer dependency data (e.g., layer dependency data 137) indicating a number of appearances of each container image layer of the plurality of container image layers in the plurality of container images.

At block 1106, the container registry service 130 receives from another service or device, a request to prefetch one or more container image layers likely to be used by future task executions. For example, the request may come from the container service 140, to prefetch one or more container image layers likely to be used by a future task execution on a virtual machine assigned to a user. As another example, the request may come from one of the additional services 170, to prefetch one or more container image layers likely to be requested at the storage device 172 (e.g., residing in one of the edge locations remotely located from the location in which the one or more container image layers are stored) by one or more user compute resources or devices configured to access the storage device 172.

At block 1108, the container registry service 130 determines, based at least in part on the image analytics data and the layer dependency data, one or more of a plurality of layers used by the plurality of container images to be delivered onto a storage device accessible by a compute resource. For example, the container registry service 130 may identify a set of container image layers to be predelivered, based at least in part on (i) the access pattern indicated by the image analytics data and (ii) the number of appearances of each container image layer in the plurality of container images indicated by the layer dependency data.

In one example, the container registry service 130 determines that a container image layer is likely to be used by a future task execution on a given service based at least in part on an indication provided by the layer dependency data that the container image layer is used by at least a threshold amount of the plurality of container images. As used herein, the term "amount," in addition to its ordinary meaning, may refer to the number (e.g., the number of container images), the percentage (e.g., the percentage of container images), or another measure. In such an example, if a given layer is included in 70% of all container images stored in the repositories 132 (or 70% of all container images accessible by the target user or the target service), the container registry service 130 may determine that the layer should be predelivered to the target service (or a compute resource associated with the target user).

In another example, the container registry service 130 determines that a container image layer is to be delivered onto the storage device accessible by a compute resource based at least in part on an indication provided by the layer dependency data that at least a threshold amount of container images including the container image layer have been accessed from a geographic region associated with the storage device. In such an example, if a given layer has been accessed from the Bahamas over 5,000 times in the last 6 months via a target service, the container registry service 130 may determine that the layer should be predelivered to a storage device that is closest to the Bahamas and accessible by the target service.

At block 1110, the container registry service 130 delivers the one or more layers identified at block 1108 onto the storage device accessible by the compute resource. For example, the container registry service 130 may do so before execution of a container image including the one or more layers identified at block 1108 is requested at the compute resource. The routine 1100 may then end.

The routine 1100 can include fewer, more, or different blocks than those illustrated in FIG. 11 and/or one or more blocks illustrated in FIG. 11 may be modified, omitted, or switched without departing from the spirit and scope of the description. For example, in some implementations, block 1106 may be omitted, and the container registry service 130 may deliver the one or more container image layers on its own initiative (e.g., without receiving a request to do so from another service or device). Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Container Registry Service

Figure 12:
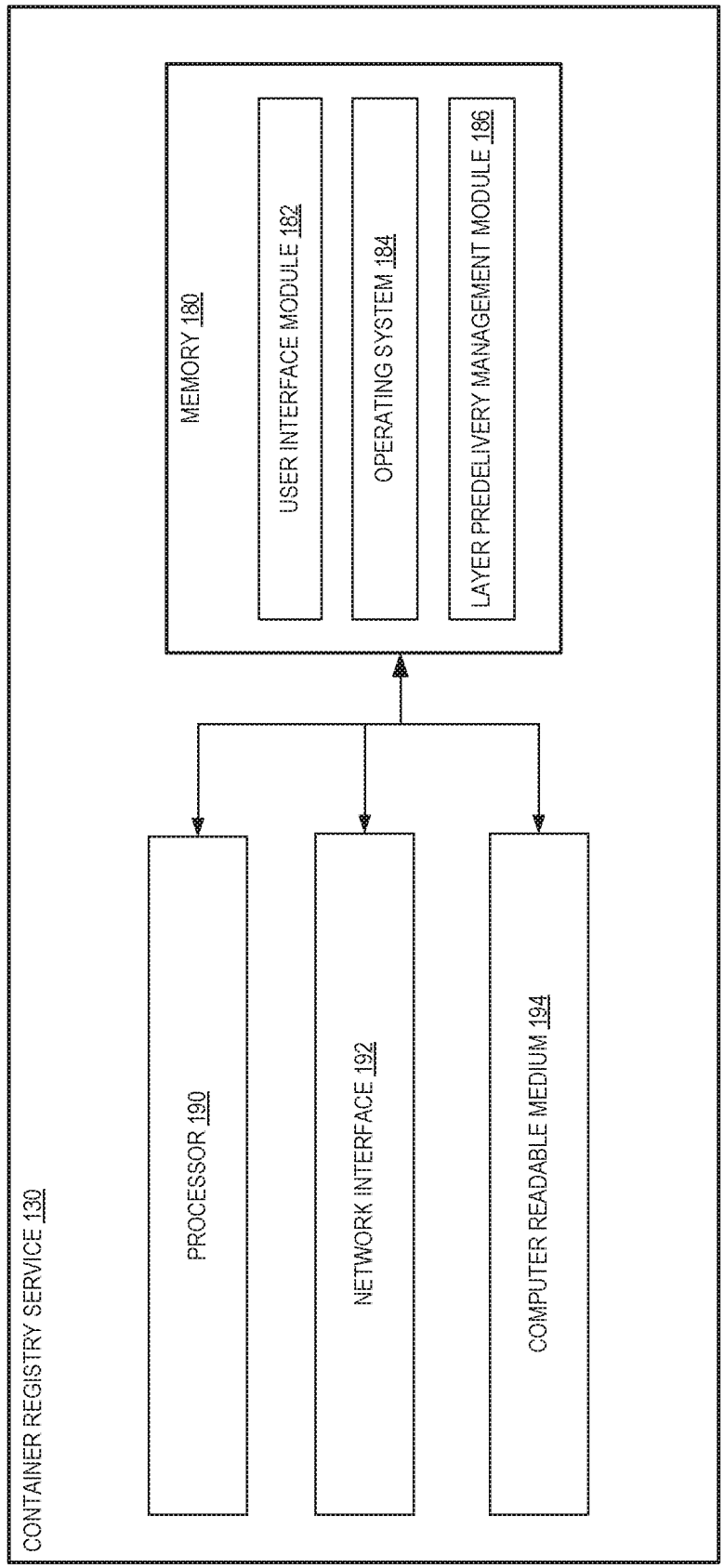
FIG. 12 depicts a general architecture of a computing device or system providing a container registry service in accordance with aspects of the present disclosure.

FIG. 12 depicts an example architecture of a computing system (referred to as the container registry service 130) that can be used to perform one or more of the techniques described herein or illustrated in FIGS. 1-11. The general architecture of the container registry service 130 depicted in FIG. 12 includes an arrangement of computer hardware and software modules that may be used to implement one or more aspects of the present disclosure. The container registry service 130 may include many more (or fewer) elements than those shown in FIG. 12. It is not necessary, however, that all of these elements be shown in order to provide an enabling disclosure. As illustrated, the container registry service 130 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 184 that provides computer program instructions for use by the processor 190 in the general administration and operation of the container registry service 130. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 182, the memory 180 may include a layer predelivery management module 186 that may be executed by the processor 190. In one embodiment, the layer predelivery management module 186 implements various aspects of the present disclosure, e.g., those illustrated in FIGS. 1-11 or described with reference to FIGS. 1-11.

While the layer predelivery management module 186 is shown in FIG. 12 as part of the container registry service 130, in other embodiments, all or a portion of the layer predelivery management module 186 may be implemented by other components (e.g., the container service 140 or one of the additional services 170) of the cloud provider network 120 and/or another computing device. For example, in certain embodiments of the present disclosure, another computing device in communication with the cloud provider network 120 may include several modules or components that operate similarly to the modules and components illustrated as part of the container registry service 130. It will also be appreciated that, in some embodiments, a user computing device (e.g., the user computing device 102 of FIG. 1) may implement functionality that is otherwise described herein as being implemented by the elements and/or modules of the container registry service 130. For example, the user computing device 102 may receive code modules or other instructions from the container registry service 130 and/or other components of the cloud provider network 120 via the network 104 that are executed by the user computing device 102 to implement various aspects of the present disclosure.

Although a single processor, a single network interface, a single computer readable medium, and a single memory are illustrated in the example of FIG. 12, in other implementations, the container registry service 130 can have a multiple of one or more of these components (e.g., two or more processors and/or two or more memories).

Example Implementations (EIs)

Some enumerated example implementations (EIs) are provided in this section, without limitation.

EI 1: A cloud provider system comprising: a set of clusters hosted on a plurality of physical machines, wherein each cluster in the set of clusters includes a virtual machine configured to perform tasks; a container registry service providing a plurality of image repositories, wherein each image repository of the plurality of image repositories is configured to at least store a plurality of container images including a plurality of container image layers and executable on the virtual machines of the set of clusters; and a container service comprising computer hardware, wherein the container service is configured to access the plurality of container images from the container registry service, wherein the container registry service is further configured to at least: generate, based at least in part on access requests received from the container service, image analytics data indicating an access pattern associated with the plurality of container images; generate, based at least in part on the plurality of container images, layer dependency data indicating a number of appearances of each container image layer of the plurality of container image layers in the plurality of container images; receive, from the container service, a request to prefetch a container image layer likely to be used by future task executions on a virtual machine assigned to a user; identify a set of container image layers based at least in part on (i) the access pattern indicated by the image analytics data, and (ii) the number of appearances of each container image layer in the plurality of container images indicated by the layer dependency data; and provide the set of container image layers to the container service, wherein the container service is further configured to at least: store the set of container image layers received from the container registry service in a cache of the virtual machine assigned to the user; receive a request to execute a first task in a first cluster in the set of clusters, wherein the first task includes at least one container image that utilizes a first container image layer of the set of container image layers stored in the cache of the virtual machine; and cause the first task to be executed on the virtual machine, wherein to cause the first task to be executed on the virtual machine, the container service is configured to at least access the first container image layer from the cache of the virtual machine.

EI 2: The cloud provider system of any preceding EI or any combination of the preceding EIs, wherein the container service is further configured to at least: determine that the set of container image layers are stored in the cache of the virtual machine; and refrain, based at least on said determining, from requesting the set of container image layers from the container registry service.

EI 3: The cloud provider system of any preceding EI or any combination of the preceding EIs, wherein the container service is further configured to at least: for each container image layer in the set of container image layers, generate a hash value for the container image layer; obtain, from the container registry service, a hash value corresponding to the container image layer; and determine that the hash value generated for the container image layer corresponds to the hash value obtained for the container image layer.

EI 4: The cloud provider system of any preceding EI or any combination of the preceding EIs, wherein the container registry service is further configured to determine that the first container image layer is likely to be used by a future task execution on the virtual machine based at least in part on an indication provided by the layer dependency data that the first container image layer is used by at least a threshold amount of the plurality of container images.

EI 5: A computer-implemented method comprising: generating image analytics data indicating an access pattern associated with a container image, wherein the container image includes a plurality of layers; generating layer dependency data indicating a number of appearances of each layer of the plurality of layers in the container image and at least one other container image; determining, based at least in part on the image analytics data and the layer dependency data, a first layer of the plurality of layers to be delivered onto a storage device accessible by a first compute resource; and delivering, before execution of the container image is requested at the first compute resource, the first layer onto the storage device accessible by the first compute resource.

EI 6: The computer-implemented method of any preceding EI or any combination of the preceding EIs, further comprising providing a pool of compute resources, wherein the pool includes a first set of compute resources that are each associated with a storage device storing a first set of prefetched layers and a second set of compute resources that are each associated with a storage device storing a second set of prefetched layers different from the first set of prefetched layers.

EI 7: The computer-implemented method of any preceding EI or any combination of the preceding EIs, wherein the image analytics data indicates how frequently the first layer has been accessed and how recently the first layer has been accessed.

EI 8: The computer-implemented method of any preceding EI or any combination of the preceding EIs, further comprising refraining from delivering a second layer of the plurality of layers onto the storage device accessible by the first compute resource based at least in part on an indication provided by the image analytics data that the second layer has not been accessed for a threshold amount of time.

EI 9: The computer-implemented method of any preceding EI or any combination of the preceding EIs, wherein the layer dependency data indicates a number of layers of the plurality of layers that depend on the first layer.

EI 10: The computer-implemented method of any preceding EI or any combination of the preceding EIs, further comprising determining that the first layer is to be delivered onto the storage device accessible by the first compute resource based at least in part on an indication provided by the layer dependency data that the first layer is used by at least a threshold amount of container images.

EI 11: The computer-implemented method of any preceding EI or any combination of the preceding EIs, further comprising determining that the first layer is to be delivered onto the storage device accessible by the first compute resource based at least in part on an indication provided by the layer dependency data that at least a threshold amount of container images including the first layer have been accessed from a geographic region associated with the storage device.

EI 12: The computer-implemented method of any preceding EI or any combination of the preceding EIs, wherein the first compute resource is one of a virtual machine instance, a bare-metal instance, a physical machine, a container, a node, or an offload card.

EI 13: A non-transitory computer-readable medium storing instructions that, when executed by a computing system, cause the computing system to at least: generate image analytics data indicating an access pattern associated with a container image, wherein the container image includes a plurality of layers; generate layer dependency data indicating a number of appearances of each layer of the plurality of layers in the container image and at least one other container image; determine, based at least in part on the image analytics data and the layer dependency data, a first layer of the plurality of layers to be delivered onto a storage device accessible by a first compute resource; and deliver, before execution of the container image is requested at the first compute resource, the first layer onto the storage device accessible by the first compute resource.

EI 14: The non-transitory computer-readable medium of any preceding EI or any combination of the preceding EIs, storing further instructions, that when executed by the computing system, cause the computing system to at least provide a pool of compute resources, wherein the pool includes a first set of compute resources that are each associated with a storage device storing a first set of prefetched layers and a second set of compute resources that are each associated with a storage device storing a second set of prefetched layers different from the first set of prefetched layers.

EI 15: The non-transitory computer-readable medium of any preceding EI or any combination of the preceding EIs, wherein the image analytics data indicates how frequently the first layer has been accessed and how recently the first layer has been accessed.

EI 16: The non-transitory computer-readable medium of any preceding EI or any combination of the preceding EIs, storing further instructions, that when executed by the computing system, cause the computing system to at least refrain from delivering a second layer of the plurality of layers onto the storage device accessible by the first compute resource based at least in part on an indication provided by the image analytics data that the second layer has not been accessed for a threshold amount of time.

EI 17: The non-transitory computer-readable medium of any preceding EI or any combination of the preceding EIs, wherein the layer dependency data indicates a number of layers of the plurality of layers that depend on the first layer.

EI 18: The non-transitory computer-readable medium of any preceding EI or any combination of the preceding EIs, storing further instructions, that when executed by the computing system, cause the computing system to at least determine that the first layer is to be delivered onto the storage device accessible by the first compute resource based at least in part on an indication provided by the layer dependency data that the first layer is used by at least a threshold amount of container images.

EI 19: The non-transitory computer-readable medium of any preceding EI or any combination of the preceding EIs, storing further instructions, that when executed by the computing system, cause the computing system to determine that the first layer is to be delivered onto the storage device accessible by the first compute resource based at least in part on an indication provided by the layer dependency data that at least a threshold amount of container images including the first layer have been accessed from a geographic region associated with the storage device.

EI 20: The non-transitory computer-readable medium of any preceding EI or any combination of the preceding EIs, wherein the first compute resource is one of a virtual machine instance, a bare-metal instance, a physical machine, a container, a node, or an offload card.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:
a set of clusters hosted on a plurality of physical machines, wherein each cluster in the set of clusters includes a virtual machine configured to perform tasks;
a container registry service providing a plurality of image repositories, wherein each image repository of the plurality of image repositories is configured to at least store a plurality of container images including a plurality of container image layers and executable on the virtual machines of the set of clusters; and
a container service comprising computer hardware, wherein the container service is configured to access the plurality of container images from the container registry service,
wherein the container registry service is further configured to at least:
generate, based at least in part on access requests received from the container service, image analytics data indicating an access pattern associated with the plurality of container images, wherein the access pattern indicates how recently or how frequently the plurality of container images have been accessed;
generate, based at least in part on the plurality of container images, layer dependency data indicating a number of appearances of each container image layer of the plurality of container image layers in the plurality of container images;
receive, from the container service, a request to prefetch a container image layer likely to be used by future task executions on a virtual machine of the virtual machines of the set of clusters that is assigned to a user;
identify a set of container image layers based at least in part on (i) the access pattern indicated by the image analytics data, and (ii) the number of appearances of each container image layer in the plurality of container images indicated by the layer dependency data; and
provide the set of container image layers to the container service,
wherein the container service is further configured to at least:
store the set of container image layers received from the container registry service in a cache of the virtual machine assigned to the user;
receive a request to execute a first task in a first cluster in the set of clusters, wherein the first task includes at least one container image that utilizes a first container image layer of the set of container image layers stored in the cache of the virtual machine assigned to the user; and
cause the first task to be executed on the virtual machine, wherein to cause the first task to be executed on the virtual machine, the container service is configured to at least access the first container image layer from the cache of the virtual machine assigned to the user.

2. The cloud provider system of claim 1, wherein the container service is further configured to at least:
determine that the set of container image layers are stored in the cache of the virtual machine; and
refrain, based at least on said determining, from requesting the set of container image layers from the container registry service.

3. The cloud provider system of claim 1, wherein the container service is further configured to at least:
for each container image layer in the set of container image layers,
generate a hash value for the container image layer;
obtain, from the container registry service, a hash value corresponding to the container image layer; and
determine that the hash value generated for the container image layer corresponds to the hash value obtained for the container image layer.

4. The cloud provider system of claim 1, wherein the container registry service is further configured to determine that the first container image layer is likely to be used by a future task execution on the virtual machine based at least in part on an indication provided by the layer dependency data that the first container image layer is used by at least a threshold amount of the plurality of container images.

5. A computer-implemented method comprising:
generating image analytics data indicating an access pattern associated with a container image of a plurality of container images stored in an image repository and executable on a compute resource, wherein the container image includes a plurality of layers, and the access pattern indicates how recently or how frequently the container image has been accessed;
generating aggregated layer dependency data for the plurality of container images, the aggregated layer dependency data indicating how one or more layers of the plurality of layers depend on one or more other layers of the plurality of layers across the plurality of container images and a number of appearances of said one or more layers of the plurality of layers in the plurality of container images;
determining, based at least in part on the image analytics data and the aggregated layer dependency data, a first layer of the plurality of layers to be delivered onto a storage device associated with a first compute resource; and
delivering, before execution of the container image is requested at the first compute resource, the first layer onto the storage device associated with the first compute resource for storage such that the first layer, but not all of the plurality of layers of the container image, is present in the storage device when execution of the container image is subsequently requested.

6. The computer-implemented method of claim 5, further comprising providing a pool of compute resources, wherein the pool includes a first set of compute resources that are each associated with a storage device storing a first set of prefetched layers and a second set of compute resources that are each associated with a storage device storing a second set of prefetched layers different from the first set of prefetched layers.

7. The computer-implemented method of claim 5, wherein the image analytics data indicates how frequently the first layer has been accessed and how recently the first layer has been accessed.

8. The computer-implemented method of claim 5, further comprising refraining from delivering a second layer of the plurality of layers onto the storage device associated with the first compute resource based at least in part on an indication provided by the image analytics data that the second layer has not been accessed for a threshold amount of time.

9. The computer-implemented method of claim 5, wherein the aggregated layer dependency data indicates a number of layers of the plurality of layers that depend on the first layer.

10. The computer-implemented method of claim 5, further comprising determining that the first layer is to be delivered onto the storage device associated with the first compute resource based at least in part on an indication provided by the aggregated layer dependency data that the first layer is used by at least a threshold amount of container images.

11. The computer-implemented method of claim 5, further comprising determining that the first layer is to be delivered onto the storage device associated with the first compute resource based at least in part on an indication provided by the aggregated layer dependency data that at least a threshold amount of container images including the first layer have been accessed from a geographic region associated with the storage device.

12. The computer-implemented method of claim 5, wherein the first compute resource is one of a virtual machine instance, a bare-metal instance, a physical machine, a container, a node, or an offload card.

13. A non-transitory computer-readable medium storing instructions that, when executed by a computing system, cause the computing system to at least:
    generate image analytics data indicating an access pattern associated with a container image of a plurality of container images stored in an image repository and executable on a compute resource, wherein the container image includes a plurality of layers, and the access pattern indicates how recently or how frequently the container image has been accessed;
    generate aggregated layer dependency data for the plurality of container images, the aggregated layer dependency data indicating how one or more layers of the plurality of layers depend on one or more other layers of the plurality of layers across the plurality of container images and a number of appearances of said one or more layers of the plurality of layers in the plurality of container images;
    determine, based at least in part on the image analytics data and the aggregated layer dependency data, a first layer of the plurality of layers to be delivered onto a storage device accessible by a first compute resource; and
    deliver, before execution of the container image is requested at the first compute resource, the first layer onto the storage device accessible by the first compute resource for storage such that the first layer, but not all of the plurality of layers of the container image, is present in the storage device when execution of the container image is subsequently requested.

14. The non-transitory computer-readable medium of claim 13, storing further instructions, that when executed by the computing system, cause the computing system to at least provide a pool of compute resources, wherein the pool includes a first set of compute resources that are each associated with a storage device storing a first set of prefetched layers and a second set of compute resources that are each associated with a storage device storing a second set of prefetched layers different from the first set of prefetched layers.

15. The non-transitory computer-readable medium of claim 13, wherein the image analytics data indicates how frequently the first layer has been accessed and how recently the first layer has been accessed.

16. The non-transitory computer-readable medium of claim 13, storing further instructions, that when executed by the computing system, cause the computing system to at least refrain from delivering a second layer of the plurality of layers onto the storage device accessible by the first compute resource based at least in part on an indication provided by the image analytics data that the second layer has not been accessed for a threshold amount of time.

17. The non-transitory computer-readable medium of claim 13, wherein the aggregated layer dependency data indicates a number of layers of the plurality of layers that depend on the first layer.

18. The non-transitory computer-readable medium of claim 13, storing further instructions, that when executed by the computing system, cause the computing system to at least determine that the first layer is to be delivered onto the storage device accessible by the first compute resource based at least in part on an indication provided by the aggregated layer dependency data that the first layer is used by at least a threshold amount of container images.

19. The non-transitory computer-readable medium of claim 13, storing further instructions, that when executed by the computing system, cause the computing system to determine that the first layer is to be delivered onto the storage device accessible by the first compute resource based at least in part on an indication provided by the aggregated layer dependency data that at least a threshold amount of container images including the first layer have been accessed from a geographic region associated with the storage device.

20. The non-transitory computer-readable medium of claim 13, wherein the first compute resource is one of a virtual machine instance, a bare-metal instance, a physical machine, a container, a node, or an offload card.

\* \* \* \* \*